(12) United States Patent
Chidambaram et al.

(10) Patent No.: US 12,536,752 B2
(45) Date of Patent: Jan. 27, 2026

(54) MIXED-REALITY SYSTEMS FOR ENHANCING STEREOTACTIC RADIOSURGERY CASE PLANNING

(71) Applicants: Cornell University, Ithaca, NY (US); Politecnico di Milano, Milan (IT); Catholic University of the Sacred Heart Milan, Milan (IT); Fondazione Policlinico Universitario Agostino Gemelli IRCCS, Rome (IT)

(72) Inventors: Swathi Chidambaram, New York, NY (US); Susan C. Pannullo, New York, NY (US); Maria Chiara Palumbo, Milan (IT); Alberto Cesare Luigi Redaelli, Milan (IT); Vito Stifano, Milan (IT); Alessandro Olivi, Milan (IT)

(73) Assignees: Cornell University, Ithaca, NY (US); Politecnico di Milano, Milan (IT); Catholic University of the Sacred Heart Milan, Milan (IT); Fondazione Policlinico Universitario Agostino Gemelli IRCCS, Rome (IT)

( * ) Notice: Subject to any disclaimer, the term of this patent is extended or adjusted under 35 U.S.C. 154(b) by 273 days.

(21) Appl. No.: 18/249,125

(22) PCT Filed: Oct. 14, 2021

(86) PCT No.: PCT/US2021/055007
§ 371 (c)(1),
(2) Date: Apr. 14, 2023

(87) PCT Pub. No.: WO2022/081862
PCT Pub. Date: Apr. 21, 2022

(65) Prior Publication Data
US 2023/0386150 A1    Nov. 30, 2023

Related U.S. Application Data

(60) Provisional application No. 63/091,673, filed on Oct. 14, 2020.

(51) Int. Cl.
*G06T 19/00* (2011.01)
*A61B 34/00* (2016.01)
(Continued)

(52) U.S. Cl.
CPC .......... *G06T 19/006* (2013.01); *A61N 5/1039* (2013.01); *G06T 15/08* (2013.01);
(Continued)

(58) Field of Classification Search
None
See application file for complete search history.

(56) References Cited

U.S. PATENT DOCUMENTS

| 11,553,969 B1* | 1/2023 | Lang | G02B 27/0172 |
| 2010/0056908 A1* | 3/2010 | Giller | A61B 34/10 |
| | | | 378/65 |

(Continued)

FOREIGN PATENT DOCUMENTS

| WO | WO-2019/103912 A2 | 5/2019 |
| WO | WO-2022/081862 A1 | 4/2022 |

OTHER PUBLICATIONS

Al Rei, "Automated 3D Visualization of Brain Cancer," Thesis, McMaster University (138 pages) (2017).
(Continued)

*Primary Examiner* — Ryan M Gray
(74) *Attorney, Agent, or Firm* — Foley Hoag LLP; Erik A. Huestis; Joshua S. Matloff

(57) ABSTRACT

Embodiments of the present disclosure relate to methods, systems, and computer program products for rendering a three-dimensional anatomical model in a virtual or aug-
(Continued)

mented reality device. In various embodiments, a method includes reading, at a remote server, a three-dimensional imaging study from a data store, where the three-dimensional imaging study includes a plurality of two-dimensional slices of at least one anatomical structure, optionally performing segmentation, at the remote server, on each of the plurality of two-dimensional slices, generating, at the remote server, a volumetric model of the at least one anatomical structure based on the plurality of two-dimensional slices, scaling, at the remote server, the volumetric model according to one or more display parameters of a virtual or augmented reality device, receiving, at the virtual or augmented reality device, the scaled volumetric model; and rendering, at the virtual or augmented reality device, the scaled volumetric model.

27 Claims, 43 Drawing Sheets

(51) Int. Cl.
    *A61B 34/10*     (2016.01)
    *A61B 90/00*     (2016.01)
    *A61N 5/10*     (2006.01)
    *G06T 15/08*     (2011.01)
    *G06T 19/20*     (2011.01)

(52) U.S. Cl.
    CPC ........ *G06T 19/20* (2013.01); *A61B 2034/105* (2016.02); *A61B 34/25* (2016.02); *A61B 2090/365* (2016.02); *A61B 2090/367* (2016.02); *G06T 2200/24* (2013.01); *G06T 2210/41* (2013.01); *G06T 2219/2016* (2013.01)

(56) References Cited

U.S. PATENT DOCUMENTS

| | | | | |
|---|---|---|---|---|
| 2012/0099770 | A1* | 4/2012 | Cagnan | A61B 34/10 |
| | | | | 382/128 |
| 2012/0197619 | A1* | 8/2012 | Namer Yelin | G16H 50/50 |
| | | | | 382/128 |
| 2015/0173846 | A1* | 6/2015 | Schneider | A61B 1/00042 |
| | | | | 600/424 |
| 2018/0286132 | A1* | 10/2018 | Cvetko | A61B 5/0015 |
| 2019/0053851 | A1* | 2/2019 | Siemionow | A61B 34/25 |
| 2020/0054398 | A1* | 2/2020 | Kovtun | G16H 40/63 |
| 2020/0197726 | A1* | 6/2020 | Cordero Marcos | A61N 5/1031 |
| 2020/0272229 | A1* | 8/2020 | Sudarsky | G06T 19/20 |
| 2021/0233429 | A1* | 7/2021 | Barber | G06F 3/011 |
| 2021/0353371 | A1* | 11/2021 | Kou | A61B 90/37 |
| 2022/0387822 | A1* | 12/2022 | Zhou | A61N 5/103 |

OTHER PUBLICATIONS

Fitski et al., "MRI-Based 3-Dimensional Visualization Workflow for the Preoperative Planning of Nephron-Sparing Surgery in Wilms' Tumor Surgery: A Pilot Study," J Health Eng, 2020: 8899049 (6 pages) (2020).

International Search Report and Written Opinion for International Application No. PCT/US2021/055007 mailed Feb. 7, 2022.

* cited by examiner

MIXED-REALITY SYSTEMS FOR ENHANCING STEREOTACTIC RADIOSURGERY CASE PLANNING

CROSS-REFERENCE TO RELATED APPLICATION

This application is the U.S. National Stage of International Application No. PCT/US2021/055007, filed Oct. 14, 2021, which claims the benefit of U.S. Provisional Patent Application No. 63/091,673, filed Oct. 14, 2020, each of which is hereby incorporated by reference in its entirety.

BACKGROUND

Embodiments of the present disclosure relate to methods, systems, and computer program products for rendering a three-dimensional anatomical model in a virtual or augmented reality device.

BRIEF SUMMARY

In various embodiments, a method includes reading, at a remote server, a three-dimensional imaging study from a data store, where the three-dimensional imaging study includes a plurality of two-dimensional slices of at least one anatomical structure. The method further includes optionally performing segmentation, at the remote server, on each of the plurality of two-dimensional slices. The method further includes generating, at the remote server, a volumetric model of the at least one anatomical structure based on the plurality of two-dimensional slices. The method further includes scaling, at the remote server, the volumetric model according to one or more display parameters of a virtual or augmented reality device. The method further includes receiving, at the virtual or augmented reality device, the scaled volumetric model. The method further includes rendering, at the virtual or augmented reality device, the scaled volumetric model.

In various embodiments, a system for rendering a three-dimensional anatomical model includes a remote server comprising a first computing node comprising a computer readable storage medium having program instructions embodied therewith. The program instructions are executable by a processor of the computing node to cause the processor to perform a method including reading, at a remote server, a three-dimensional imaging study from a data store, where the three-dimensional imaging study includes a plurality of two-dimensional slices of at least one anatomical structure. The method further includes optionally performing segmentation, at the remote server, on each of the plurality of two-dimensional slices. The method further includes generating, at the remote server, a volumetric model of the at least one anatomical structure based on the plurality of two-dimensional slices. The method further includes scaling, at the remote server, the volumetric model according to one or more display parameters of a virtual or augmented reality device. The system further includes a virtual or augmented reality system comprising a virtual or augmented reality display and a second computing node comprising a computer readable storage medium having program instructions embodied therewith. The program instructions are executable by a processor of the computing node to cause the processor to perform a method including receiving, at the virtual or augmented reality device, the scaled volumetric model. The method further includes rendering, at the virtual or augmented reality device, the scaled volumetric model.

A computer program product for rendering a three-dimensional anatomical model, the computer program product comprising a computer readable storage medium having program instructions embodied therewith. The program instructions are executable by a processor to cause the processor to perform a method including reading, at a remote server, a three-dimensional imaging study from a data store, where the three-dimensional imaging study includes a plurality of two-dimensional slices of at least one anatomical structure. The method further includes optionally performing segmentation, at the remote server, on each of the plurality of two-dimensional slices. The method further includes generating, at the remote server, a volumetric model of the at least one anatomical structure based on the plurality of two-dimensional slices. The method further includes scaling, at the remote server, the volumetric model according to one or more display parameters of a virtual or augmented reality device. The method further includes receiving, at the virtual or augmented reality device, the scaled volumetric model. The method further includes rendering, at the virtual or augmented reality device, the scaled volumetric model.

DETAILED DESCRIPTION

Figure 1:
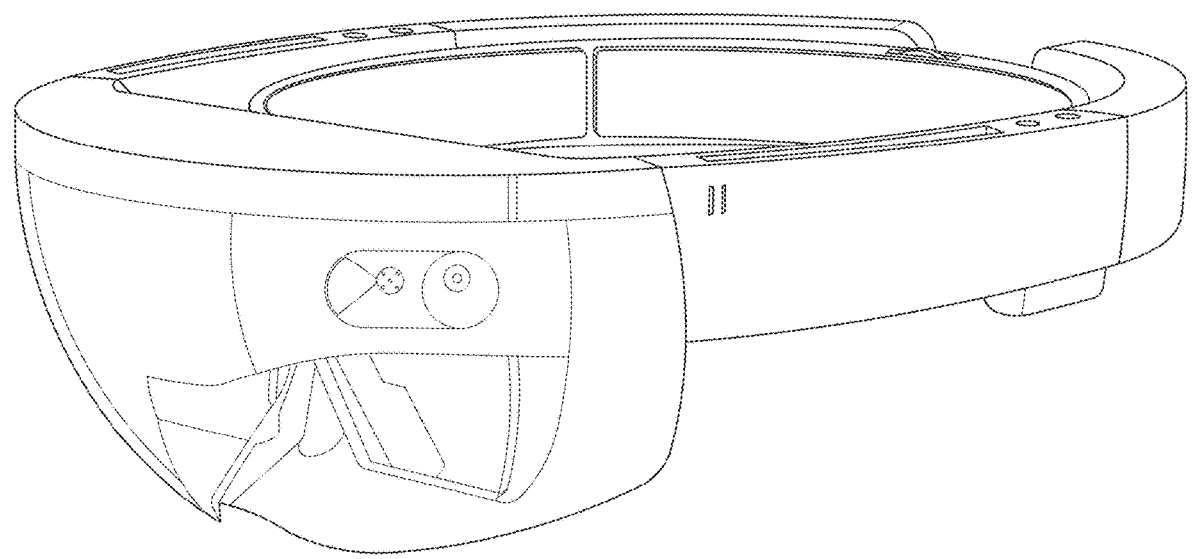
FIG. 1 illustrates an exemplary virtual or augmented reality device in accordance with an embodiment of the present disclosure.

Because neurosurgery involves complex anatomy and neurosurgical procedures require high levels of accuracy and extreme precision, a thorough comprehension of topographic neuroanatomy is paramount in neurosurgery. Image-guided neuronavigational technologies are often relied upon in neurosurgical procedures. In recent years, healthcare professionals have gained an interest in extended reality (XR) technologies, such as virtual reality (VR), augmented reality (AR), and mixed reality (MR) as an aid for surgery. These technologies vary in the degree to which they blend real and virtual worlds: VR immerses the user in an entirely artificial environment, shutting out the real world; AR allows the user to visualize virtual objects superimposed on the real physical world; with MR, objects are merged into a real environment, where users can manipulate and interact with them. XR takes advantage of various hardware, from devices such as smartphones to head-mounted displays (HMD) to provide these digitally enhanced experiences. In this context, MR represents a potential resource capable of greatly facilitate the understanding of neuroanatomy by visualizing virtual models superimposed on the physical world, along with the possibility to interact in an immediate way with projected digital contents.

Augmented Reality (AR) and/or Mixed Reality (MR) technologies, which allow the viewer to merge a virtual environment into a real, physical environment, have an emerging role in the future of neurosurgery. AR and MR allow the viewer to visualize anatomical structures beneath the surface and to virtually manipulate these views to aid in surgical planning and education. Furthermore, AR and MR technologies may allow the surgeon to view a three-dimensional (3D) reconstruction of an anatomical region of interest and to interact with it in real-time, thus improving upon the simple two-dimensional (2D) screen views that are offered by most current neuronavigation systems. While AR and MR systems may be implemented in the neurosurgical subspecialties of spine, tumor, vascular, and pediatrics, this technology has not yet been studied in the growing neurosurgical subspecialty of brain and spine stereotactic radiosurgery (SRS).

SRS is a highly interdisciplinary subspecialty in neurosurgery where a multidisciplinary team (MDT) approach is an essential part of the case planning and discussion process. One of the main, enduring challenges of these collaborative, interdisciplinary case planning discussions is that communication is oftentimes limited by each person's ability to mentally convert 2D radiological images to 3D anatomical views. To address this challenge, an MR headset is provided along with an application that can assist in interactive, 3D visualization of the patient's neuroanatomy in SRS case planning discussions. MR technology has not been integrated into the MDT case planning and discussion setting, but this technology has the potential to enhance the discussions of the treatment team in planning and discussing radiosurgery and neurosurgery cases in in-person and remote conferences settings. To address this opportunity for enhancing SRS multidisciplinary team discussions, a MR headset may be integrated into SRS case planning discussions, which may provide utility in planning and visualizing. A discussion of this MR system in six exemplary brain tumor SRS cases is also provided.

In various embodiments, a Mixed Reality (MR) application may utilize a commercial three-dimensional visualization engine. In various embodiments, the MR application may utilize one or more toolkits specific to augmented, mixed, and/or virtual reality applications. For example, the application may include Unity 3D, a game engine developed by Unity Technologies and used in conjunction with the Mixed Reality Toolkit Library (MRTK). In various embodiments, MRTK-Unity is a project that provides a set of components and features, used to accelerate cross-platform MR app development in Unity. In various embodiments, virtual objects created may be controlled through scripts attached directly to them and written in a specific programming language (e.g., c #). In various embodiments, the three-dimensional visualization engine may include a library of components (or scripts) that can be attached to game objects and it also gives the possibility to create new ones. In various embodiments, a commercially-available integrated development environment (IDE), such as Visual Studio, may be used to create scripts and add the scripts as components to game objects in Unity.

In various embodiments, patient specific 3D models of the brain may be created by performing segmentation on one or more of the two-dimensional slices within a three-dimensional imaging study. In various embodiments, segmentation may be performed on all two-dimensional slices. In various embodiments, segmentation may be performed on a subset of the two-dimensional slices. In various embodiments, interpolation may be performed between adjacent slices to thereby create a three-dimensional model of the segmented objects. In various embodiments, patient specific 3D models of the brain may be created by exporting the .obj format from already segmented images derived from Magnetic Resonance Imaging (MRI) or Computed Tomography (CT) scans. In various embodiments a commercially available medical image processing tool may be utilized. For example, 3D slicer, an open-source platform for medical image informatics, processing, and analysis may be used. In various embodiments, visualization of the medical images (e.g., one or more two-dimensional slices) directly inside the application may be possible by importing an open source library for volume rendering visualization. In various embodiments, the open source library may access a three-dimensional imaging study from a database and retrieve one or more two-dimensional image slices included in the three-dimensional imaging study.

In various embodiments, the methods, systems, and computer program products may be used for pre-procedural planning and discussing for interdisciplinary SRS conferences, physician use to enhance case planning and visualization, and/or educational uses with residents in teaching conferences.

Methods:

A commercially-available MR device was used for the visualization of virtual holograms, as shown in FIG. 1. The MR device may use a head mounted display (HMD) with video transparent displays, weighs 580 g, and may have an untethered and wireless design. Because this device is employs an HMD, the viewed content may be aligned with the user's view. The MR application may be built on Unity 3D (version 2019.2.17), a game engine developed by Unity Technologies and used in conjunction with the Mixed Reality Toolkit Library (MRTK). All the virtual objects may be controlled through scripts written in c # using Visual Studio 2019 as the integrated development environment (IDE). The MR application may provide interactive features including the ability to hide anatomical structures, isolate lesions and planning treatment volumes (PTVs), visualize axial coronal, and sagittal MRI planes overlaid on the 3D model and manipulate handheld clipping planes that allow one to visualize cross sections of the model in real time and to change the opacity of anatomical structures within the model.

Hologram Creation: Patient specific 3D models of the brain may be created exporting the .obj format from already segmented images derived from Magnetic Resonance Imaging (MRI) or Computed Tomography (CT) scans. To do so, 3D slicer, an open-source platform for medical image informatics, processing, and analysis, was used. The visualization of the medical images directly inside the application was possible by importing an open source library for volume rendering visualization.

In various embodiments, accurate 3D segmentation may be generated from 2D MRI scans to create precisely reconstructed holograms integrated into the MR headset. In various embodiments, commercially-available software may be used such as via FreeSurfer, Vbm, and Ibaspm to segment a brain (e.g., healthy brain). In various embodiments, performing segmentation of the brain for patients with brain tumors is more complicated and often requires the combination of multiple modalities. In various embodiments, radiosurgical treatments may rely on effective detection and precise segmentation of lesions. In various embodiments, automatic brain segmentation in radiosurgery may be performed based on deep-learning. For example, an artificial learning system may be applied for the pre-treatment segmentation of gliomas and brain metastases for the purpose of maximizing safety during high dose radiation treatments. In various embodiments, methods of automatic segmentation can also be applied laterally to address the segmentation challenges that sometimes arise when creating holograms for MR use in SRS.

Other challenges to consider with regards to increasing the use of MR in SRS case discussions and planning include the hurdle of acquiring these somewhat rare devices on a large scale at academic centers. The authors are optimistic that with the advent of newer, cheaper, and scalable production of MR headsets, this issue will be easily addressed in the coming months to years. Lastly, there are some workflow considerations and challenges that also have to be acknowledged in the process of increasing the widespread use of MR in SRS. For instance, in order for this technology to be successfully incorporated in case discussions, each institution must establish a methodology of transferring the requisite imaging data for each patient between team members and allocating tasks in creating and uploading holograms prior to MDT case conferences. In our preliminary experience with creating and executing these holograms, the workflow can be successfully established with a few team meetings to delegate tasks. Furthermore, the apparent benefits of using this technology in case discussions highlighted in this technical note further endorse the potential utility in future incorporation of these workflow changes and should be further investigated with clinical trials to confirm that these techniques translate into improved communications and patient care.

Because the healthcare industry (e.g., neurosurgery) is increasing the use of telemedicine and remote tele-immersive conferencing, there is a unique opportunity in this space for the incorporation of MR technologies to improve remote case discussions and communication. Also, there is great potential application of machine learning and artificial intelligence with the field of MR in medicine. Machine learning can more accurately segment MRI scans and co-register images in augmented and mixed reality settings.

Conclusions: Mixed reality enhances our ability to deliver safe and efficient SRS treatment plans by putting all members of an interdisciplinary treatment team on the same visualization plane when discussing complex cases. MR also helps us understand the size, shape, and distributions of lesions more clearly and in 3D. This technology makes the relationship between target lesions, OARs, and surface anatomy more obvious. There are also several areas of potential future expansion in this field including in the integration of machine learning and in improvements in automation of brain segmentation.

In various embodiments, a user interface of the MR application may include any of the following features. In various embodiments, the application may include a feature to hide structures, which allows viewer to look inside the brain by hiding various anatomical components separately. In various embodiments, the application may include a feature to visualize lesions and/or planning treatment volume (PTV). In various embodiments, the application may include a feature to visualize MRI planes in Axial, Coronal and/or Sagittal projection. In various embodiments, this feature may allow a user to pan across the plane and/or combine one or more planes with the different structures of the model. In various embodiments, the application may include a feature to fade structures and thereby modify the opacity of the structures. In various embodiments, the application may include a feature to include a clipping plane. In various embodiments, a clipping plane is a malleable MRI plane that can be scrolled on the model, visualizing the MRI at any inclination. In various embodiments, a clipping plane may include a clear plane that clips through the model, which may be good for correlating surface markers to lesion.

In various embodiments, an initial resolution of the volumetric model may be dependent on the resolution of the images over which the segmentation is made. In various embodiments, the segmented models may be optimized to work efficiently in the application, without being unnecessarily too resolute. In various embodiments, this optimization process may include the application of filter like decimation tool to reduce the number of elements (e.g., triangles) that compose the model. In various embodiments, the decimation tool may perform a simultaneous re-mesh that evenly distribute the new triangles discretization over the surface. In various embodiments, the application may include a shade smooth option for the newly generated mesh. In various embodiments, the model may keep the same reduced number of elements and it is possible to reproduce and visualize a smoother surface. In various embodiments, the amount of reduction in resolution of the model is chosen depending on the anatomical part treated. In various embodiments, a high resolution is applied to one or more predetermined regions (e.g., target regions) of the volumetric model while other regions (e.g., non-target regions) have a lower resolution. For example, regions such as small lesions, nerves, vessels or any anatomical part with small dimensions are treated carefully so to keep the accuracy of the model as high as possible. In various embodiments, the target region may be along a treatment or surgical path. In various embodiments, while segments such as skull, cerebrum, cerebellum may be simplified in the volumetric model as they contain millions of elements that can be too resources expensive without adding any useful information.

In various embodiments, models may be segmented in advance using commercial software and on a different working station. In various embodiments, the segmented models may be loaded during the development process of the app before its deployment on the MR device. In various embodiments, a remote server may be provided where segmented models can be imported. In various embodiments, the app may be connected to the remote server having the segmentations thereon. In various embodiments, the remote server may process the segmented images into a three-dimensional volumetric model to be exported to the MR device. In various embodiments, the remote server may perform interpolation between two-dimensional slices. In various embodiments, the MR device may directly stream the volumetric model from the remote server.

In various embodiments, a commercially-available rendering algorithm may be used to render the volumetric model. In various embodiments, the rendering algorithm may include a function to allow the dynamic change in scale by the user of the rendered images. In various embodiments, the rendering algorithm may apply the correct physical dimension of the raw images to the rendered volumetric model. In various embodiments, the user may be capable of enlarging/reducing the three-dimensional volumetric models coherently with the two-dimensional image registered on the model. In various embodiments, both the two-dimensional slices and the three-dimensional volumetric model may be rendered with real physical dimensions coming from the raw DICOM images.

In various embodiments, full resolution may be maintained in those images where the number of slices and pixels and their dimensions do not interfere with the rendered hologram stability. Stability may be defined where the application is running between 40-60 frame per seconds. Example: CT/MRI scan with 512×512 pixels and 251 slices with a resolution of 0.43×0.43×1 may not slow down the application while running. In various embodiments, a reduction in the number of slices may be performed when working with high resolutions CT scans. For example, a higher resolution CT scan may be a scan having a number of slices more than 500 and/or common slice thickness less than 1 mm. In various embodiments, using a bilinear interpolation the number of slices is cut down (e.g., around 250 slices instead of over 500) and Hologram stability double checked. In various embodiments, a compression of the images from 16 bit to 8 bit may also be performed to reduce the size of the final imported image volume.

In various embodiments, one or more organ-at-risk (OAR) may be determined. In various embodiments, an organ-at-risk may be any healthy tissues/organs placed near the clinical target volume (CTV) whose irradiation could cause damage that would make changes to the radiotherapy treatment plan. For example, the heart in radiotherapy with LINAC of the left breast cancer, is an organ at risk. In various embodiments, the organs-at-risk may be considered as normal segments during the model generation, so the user can hide/fade them on demand in the application. In various embodiments, within the user interface menu of application, the organs-at-risk may be grouped in a single panel to make them easily accessible.

In various embodiments, image processing of one or more medical images from source imagery to rendered three-dimensional model may include the following steps. In various embodiments, the application may receive CT and/or MRI from one or more image sources. In various embodiments, the application may create segments in DICOM format from the source images. For example, commercially-available software may be used, such as a SRS Planning system. In various embodiments, when segmenting the images, the segments may be normalized prior to transfer to a volumetric model creation tool. In various embodiments, for SRS cases, DICOM segments generated by the planning system may be resampled at a higher resolution on the planning system. In various embodiments, these resampled segments can then be anonymized and uploaded to the volumetric model creation tool for further processing. In various embodiments, starting from DICOM files, conversion of the segments into volumes is completed for the imaging study. In various embodiments, the DICOM files may be checked and if the segmentation is deemed not satisfying, modified using tools from the volumetric model creation tool. In various embodiments, the created volumetric model(s) may be exported in a predetermined (e.g., .obj) format. In various embodiments, the predetermined format of the segmented volumetric model may be imported into a three-dimensional optimization software. In various embodiments, the optimization process described above may be performed at this step. In various embodiments, the optimized volumetric model may be exported using a pre-determined (e.g. .fbx) format. Compared to .obj, .fbx is able to compress the size of the exported data without changing any properties of the model itself. In various embodiments, the optimized volumetric model may be imported in a three-dimensional rendering software (e.g., Unity) and rendered in the mixed reality device.

Six Exemplary Applications of a Mixed Reality Device in SRS case discussions and planning.

Case Scenario 1: Postoperative Resection Cavity

Figure 2A:
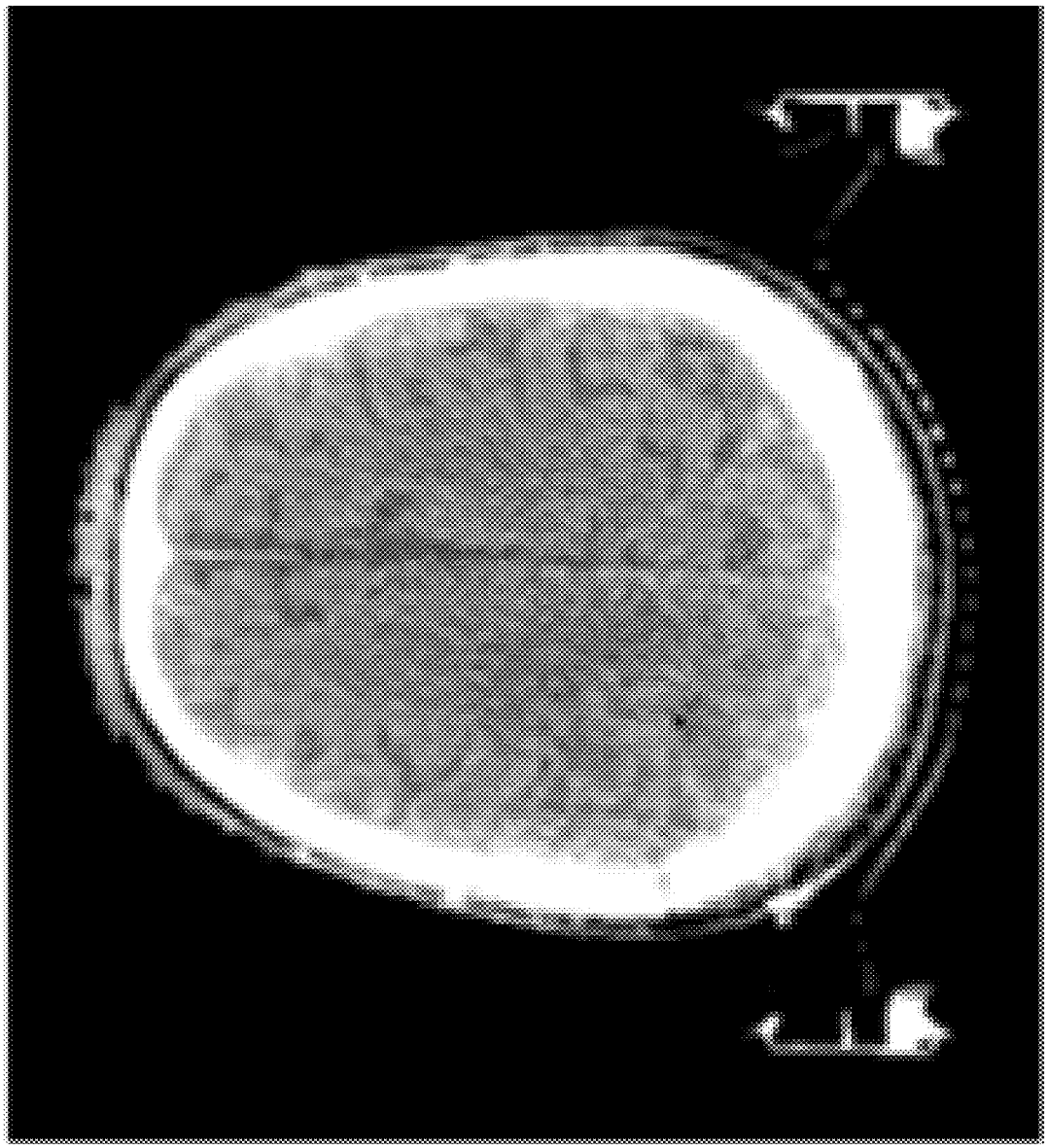
FIGS. 2A-2B illustrate magnetic resonance imaging (MRI) scans of a head in accordance with an embodiment of the present disclosure.
Figure 2B:
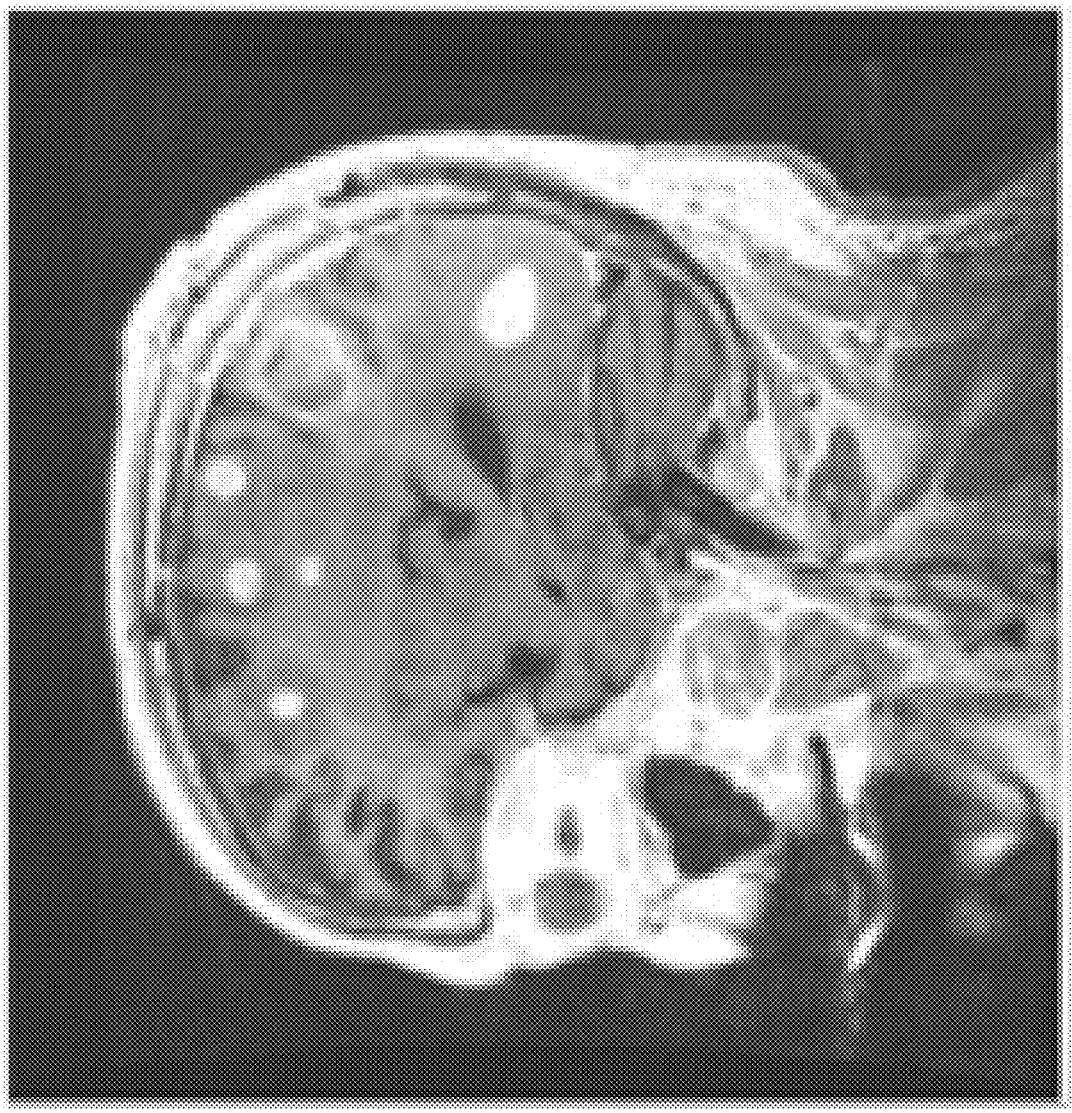
Figure 2C:
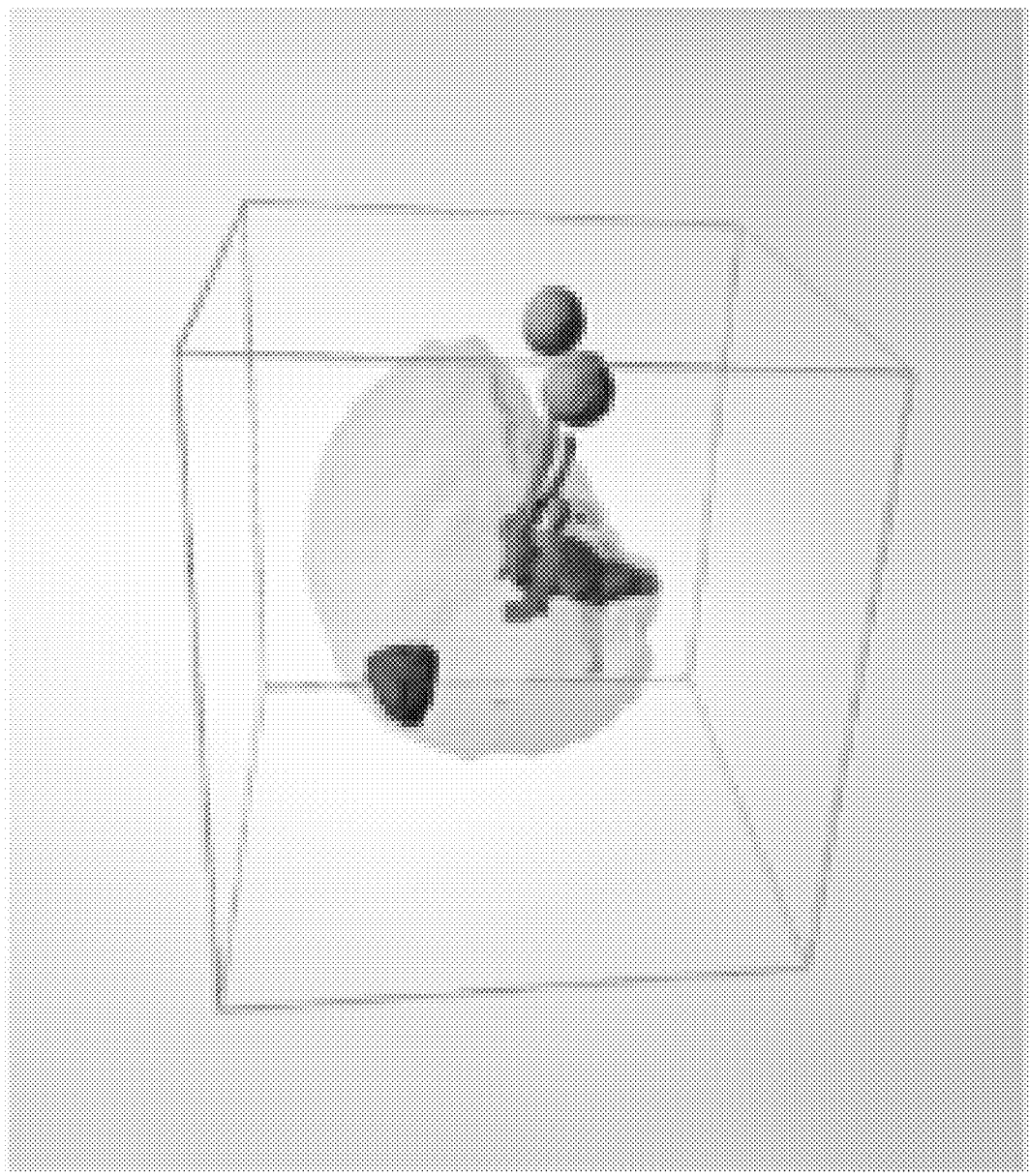
FIGS. 2C-2F illustrate a virtual model of stereotactic radiosurgery (SRS) to post-operative resection cavity in accordance with an embodiment of the present disclosure.
Figure 2D:
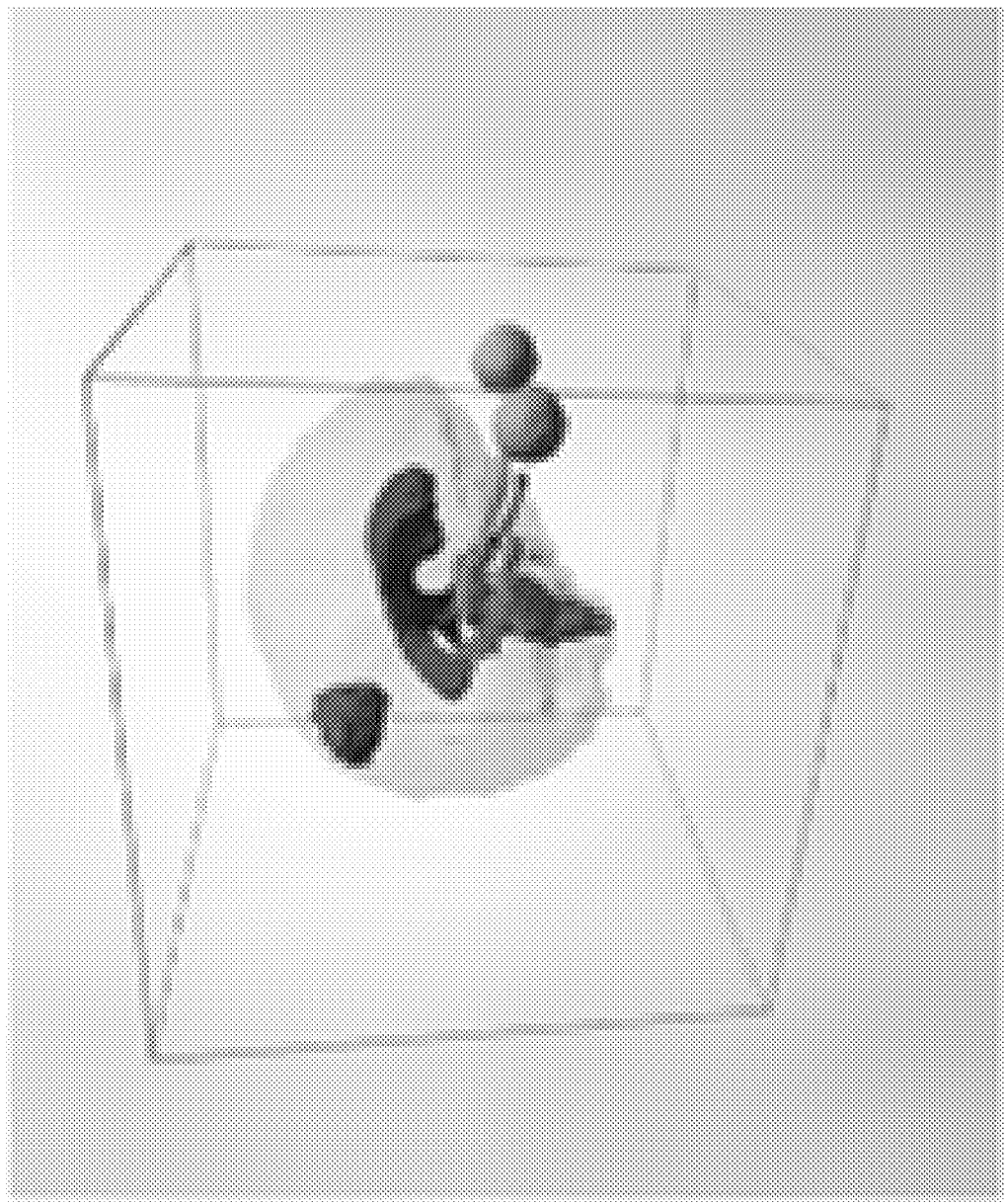
Figure 2E:
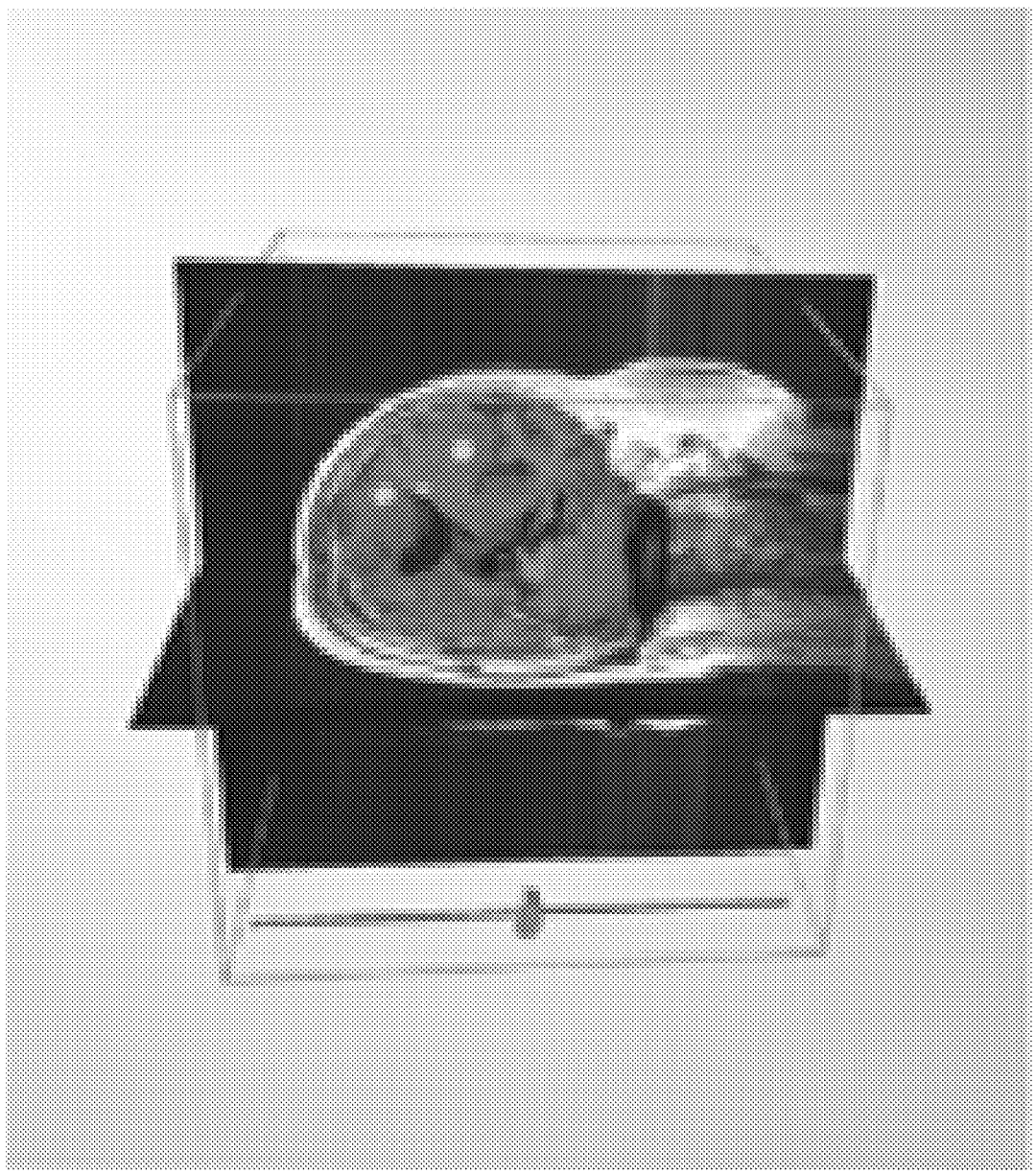
Figure 2F:
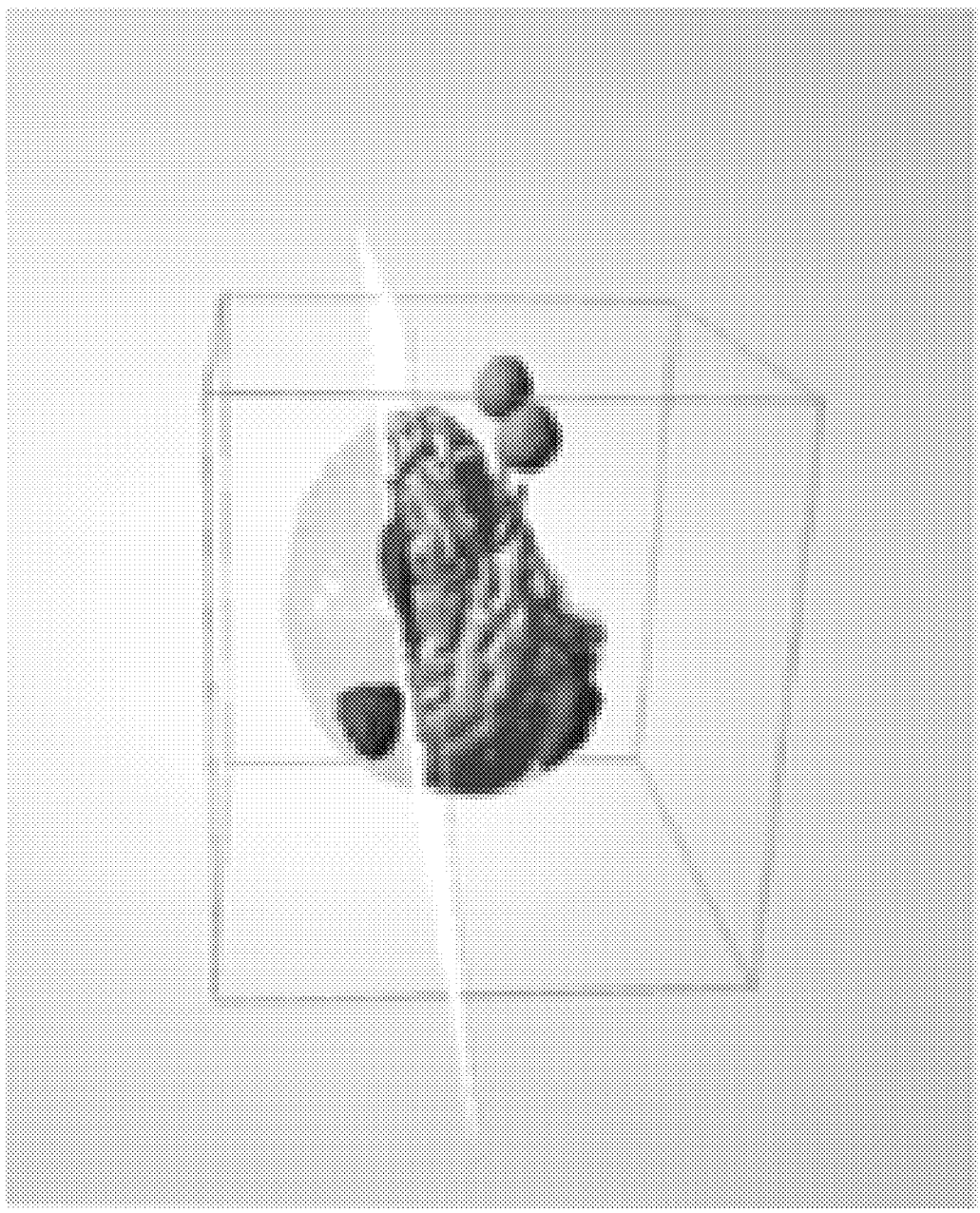

A common SRS candidate is a patient who needs post-operative radiation to a surgical cavity following resection of a brain metastasis, with a goal of minimizing risk of local recurrence. Postoperative SRS focally addresses the surgical cavity to while minimizing the risk of neurocognitive detriment associated with wider field irradiation techniques such as whole brain radiation therapy. Often these cases require careful planning to avoid nearby eloquent structures and organs at risk (OARs) while maximizing the radiation dose to the cavity itself. Patients who undergo resection of brain metastases are at significant risk of cavity local recurrence without additional radiation therapy. In our MDT SRS team discussions, the radiologist provides an assessment of a radiographic extent of resection. Then the surgical team provides feedback on intraoperative findings and operative approach. The neuropathologists also discuss the results of the histology and molecular studies which yield a pathological diagnosis of the tumor. Following this preliminary discussion, the neurosurgeon and radiation oncologist, along with the dosimetry and physics teams, develop a plan for post-operative SRS based on this data. The formulation of the treatment plan is often based on discussions of the MRI and CT scans on a 2D screen, as shown in FIGS. 2A-2B. The introduction of MR technology in this step would allow for an elaboration of these discussions by easily allowing each viewer to see and interact with the same 3D hologram when discussing cases. This holographic representation would further improve understanding of the relationships between key structures and the resection cavity. For instance, the hologram viewed and manipulated through the MR device gives a better impression of the size and shape of the resection cavity and allows the surgeon to explain their operative approaches most easily to the team. As seen in FIG. 2C, the MR technology also allows for better visual approximation of the resection cavity and nearby OARs. Furthermore, the operative corridor can be more clearly imagined when the cerebrum is faded away. It is also important to note that in the immediate postoperative period, the resection cavity is a dynamic entity that can alter its shape and configuration. Published literature has reported that tumor size (>3 cm), dural involvement and longer time from surgery were significant predictors of cavity volume reduction and that caution must be taken when treating cavities in the early (<21 days) interval after surgery, although data suggests that early treatment optimizes chances of local control (REF) and therefore treatment is often performed early, during the early postop period. Given these particular concerns, the utility of MR in improving visualization of the PTVs and cavity volumes becomes more apparent and useful in case planning, as shown in FIG. 2D. With MR, the MRI planes can also be integrated with the model to further understand the 2D to 3D transition, as shown in FIG. 2E. A feature called the clipping plane allows for better understanding of the surface anatomy in relation to the treatment region, as shown in FIG. 2F. All of these unique features of using MR in the SRS case discussion setting can help improve our ability to visualize and plan SRS cases.

Case Scenario 2: Resection Cavity with Metastasis

Figure 3A:
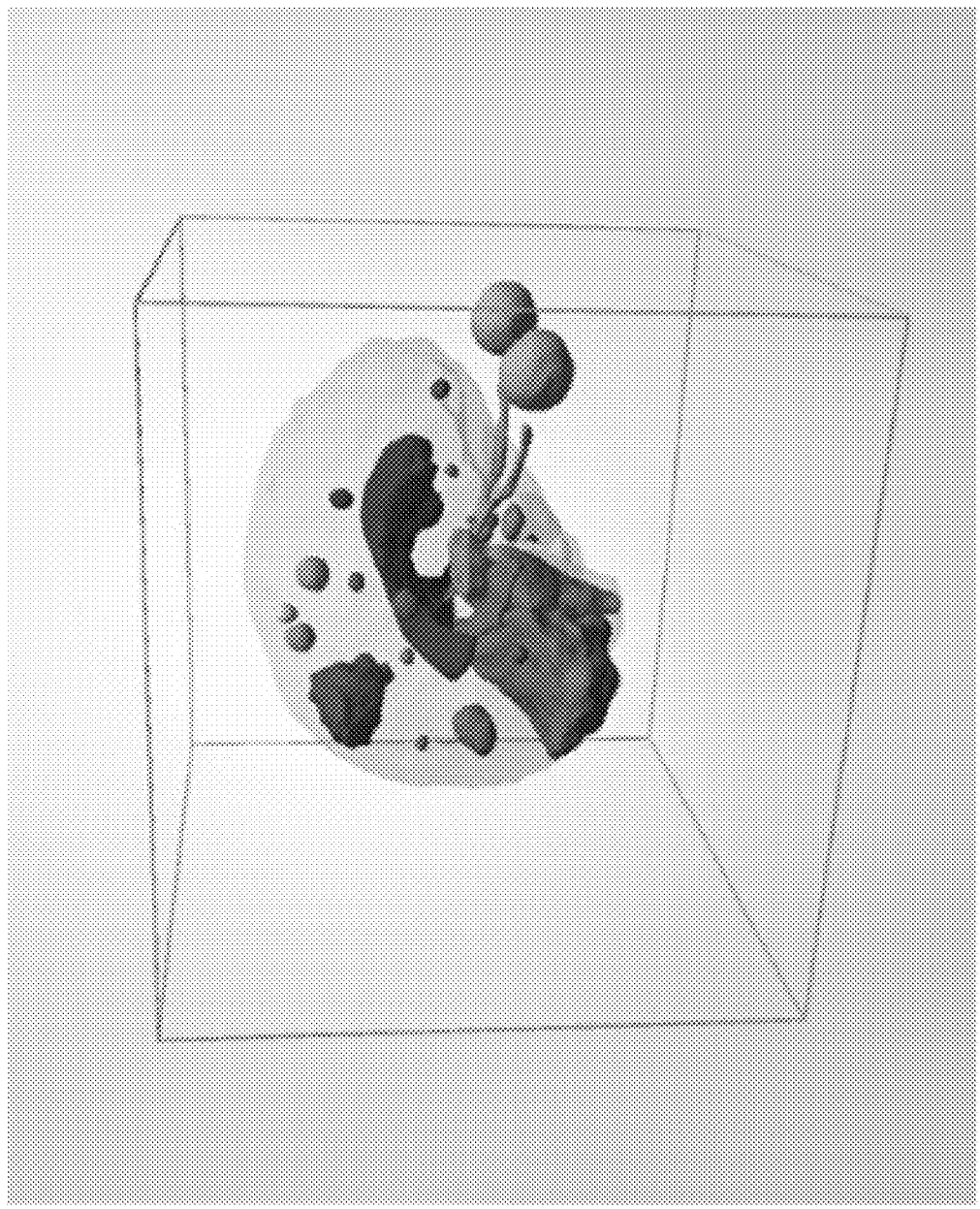
FIGS. 3A-3C illustrate a virtual model of a resection cavity with metastasis in accordance with an embodiment of the present disclosure.
Figure 3B:
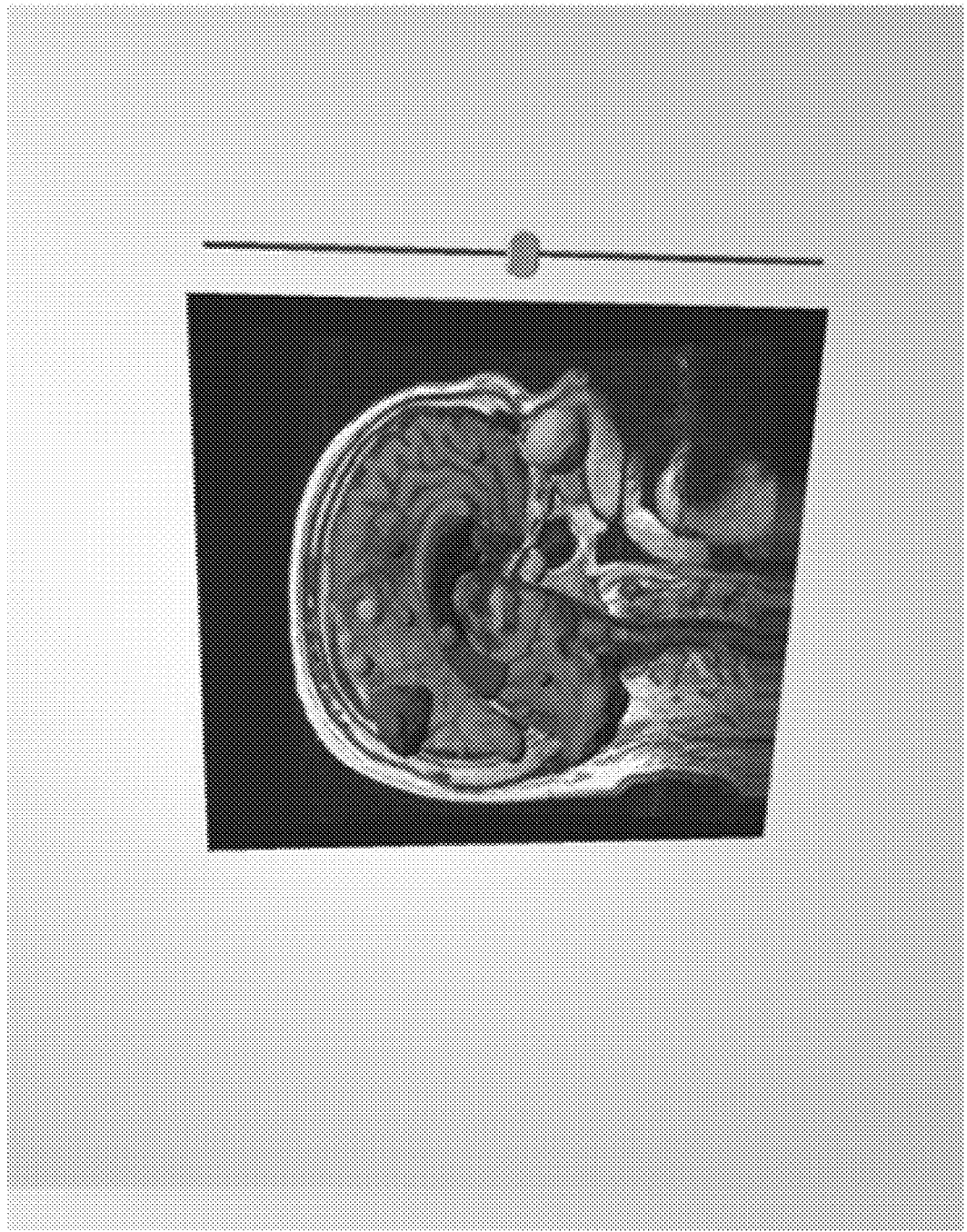
Figure 3C:
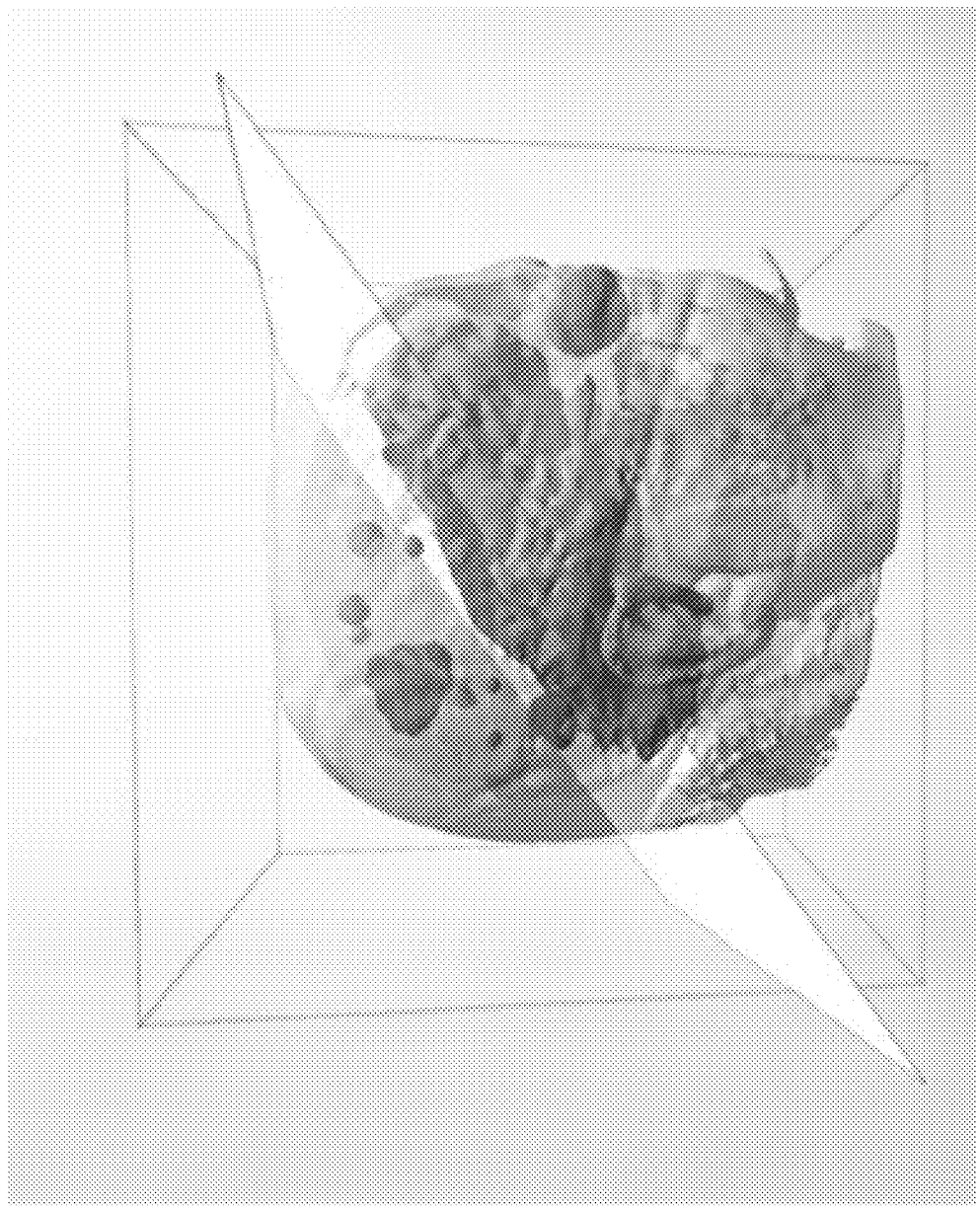

In some cases, a patient has multiple brain metastases with one or two dominant lesions that warrant resection due to their mass effect or rapid growth rate. In such cases, the case planning discussion must go beyond the planning of solely postoperative SRS to the resection cavity to also include treatment contours and plans for the persistent metastases. In these cases, the maximum dose constraints to OARs is an important consideration given the multiple lesions and potential for overlapping treatment arc. Using the MR application and the MR device OARs and radiosurgical targets can be isolated and combined in various ways to help maximize the safety of the treatment plans by helping the dosimetrists and physicists see these key relationships in a dynamic and interactive way, as shown in FIG. 3A. Furthermore, incorporating the MRI planes with the holograms in the visualization of the case while planning can be helpful in understanding the relationship between the resection cavity and lesions, as shown in FIG. 3B. MR in these cases can also help provide a clearer depiction of the exact size and shape of the lesions that is often difficult to gauge with 2D radiographic imaging. This new way of seeing and planning these cases with MR can help in determining whether lesions can be clustered in the treatment planning for staged treatments of metastases as each lesion and resection cavity can be virtually isolated to form groupings for staged treatments. The clipping plane feature allows us to view the relationship with the scalp and help create plans that minimize scalp dose with grouping of lesions and fractionation, as shown in FIG. 3C.

Case Scenario 3: Multiple Brain Metastases

Figure 4A:
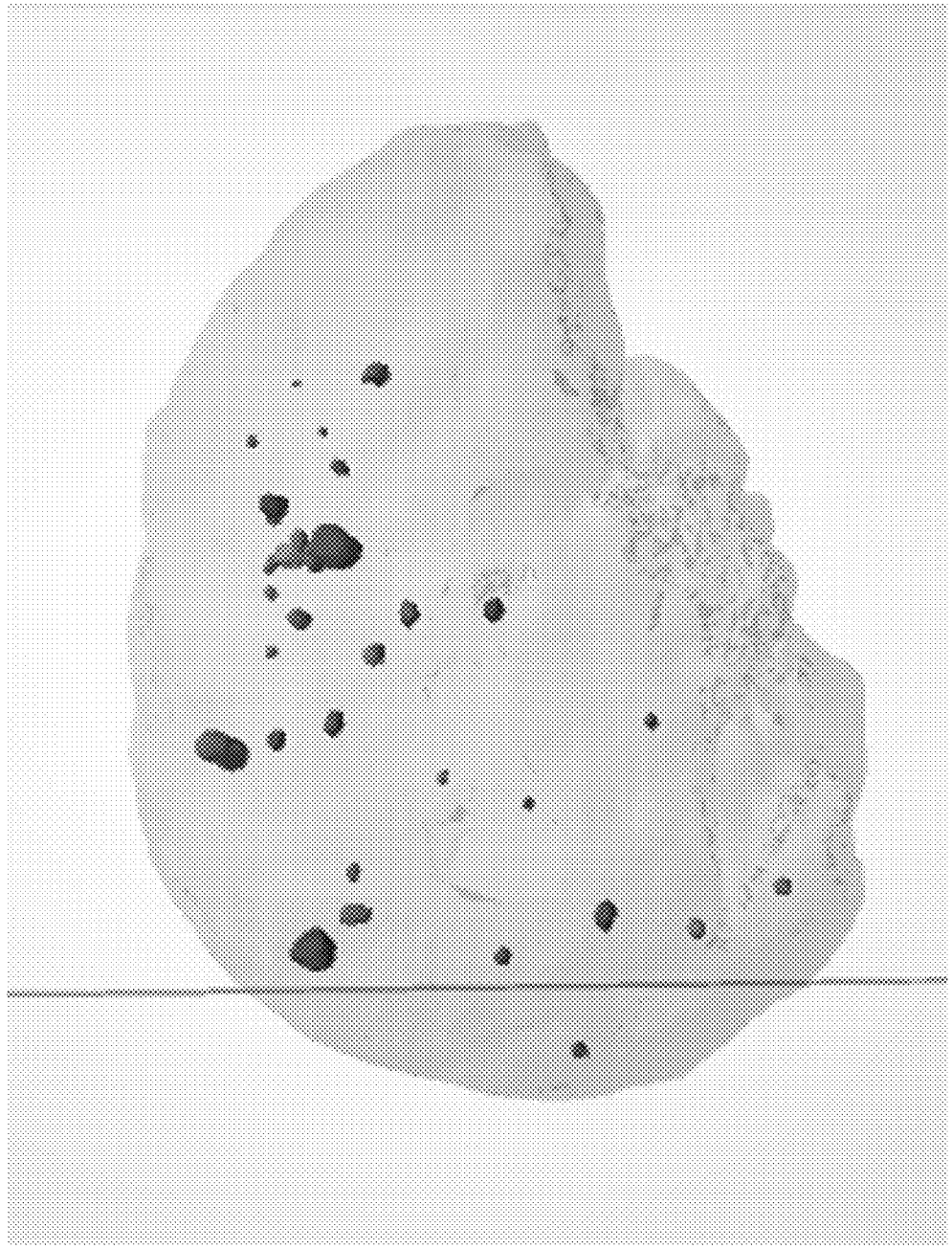
FIGS. 4A-4C illustrate a virtual model of SRS for multiple brain metastases in accordance with an embodiment of the present disclosure.
Figure 4B:
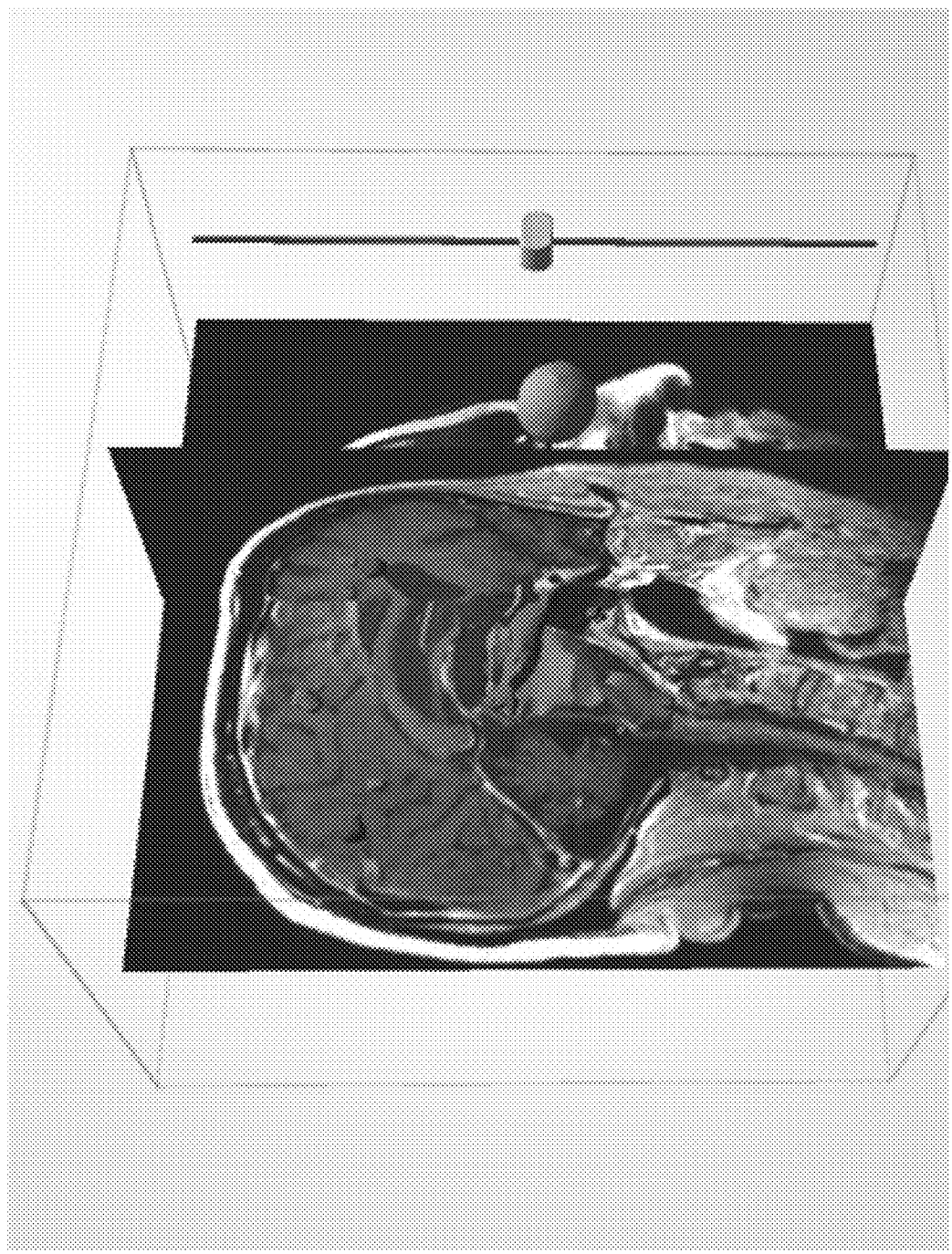
Figure 4C:
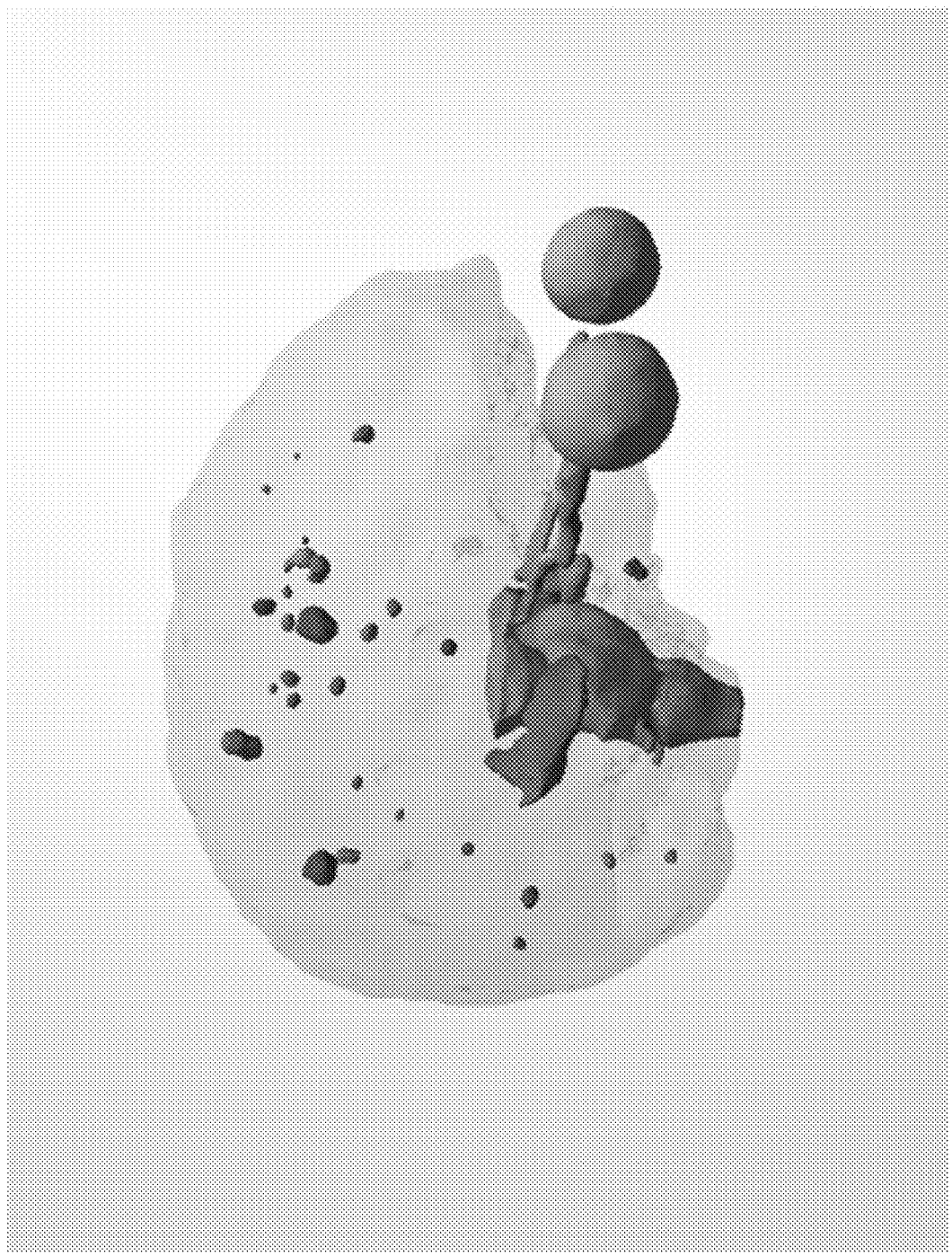

With the advent of technological and clinical advancements in SRS, patients with numerous intracranial metastases that were previously were treated with whole brain radiation therapy are now undergoing focal SRS. We are now able to safely treat patients with dozens of metastatic lesions with the SRS modalities that are currently available. Given that SRS is increasingly deployed as a treatment option in these scenarios, it is helpful to have MDT discussions to determine the feasibility of treating a patient with multiple metastases. On a fundamental level, the main visual challenge in planning these cases for several metastases is understanding the topography or spread of many, often small, lesions intracranially; incorporating this MR technology can provide a quick visual representation of the layout of the intracranial disease load, which can help us develop a preliminary evaluation of the feasibility of pursuing SRS treatment in these cases. MR technology can enhance these discussions by allowing all practitioners on the team to view the patient's tumor load and topography in 3D holograms, as shown in FIG. 4A. This way of visualizing and reviewing cases provides an appreciation of the clusters of lesions that might be present, especially as some lesions are so small that they are not easily understood purely on 2D MRI evaluation. Moreover, the hologram in a MR headset allows for an interactive view of multiple lesions where MRI planes can be combined to show the transformation from 2D visualization to 3D, as shown in FIG. 4B. The features associated with incorporating this MR technology make it possible to more accurately visually approximate the proximity of lesions to OARs, as shown in FIG. 4C. Also, changing the opacity of certain anatomical structures such as the ventricles and brainstem can also be helpful in elucidating their relationship to adjacent subcentimeter lesions. Importantly, once the decision is made to move forward with focal SRS for the lesions, a more granular discussion of case planning can ensue with the help of MR in isolating and clustering groups of metastases for fractionated or staged treatment as needed.

Case Scenario 4: Brainstem Metastases

Figure 5A:
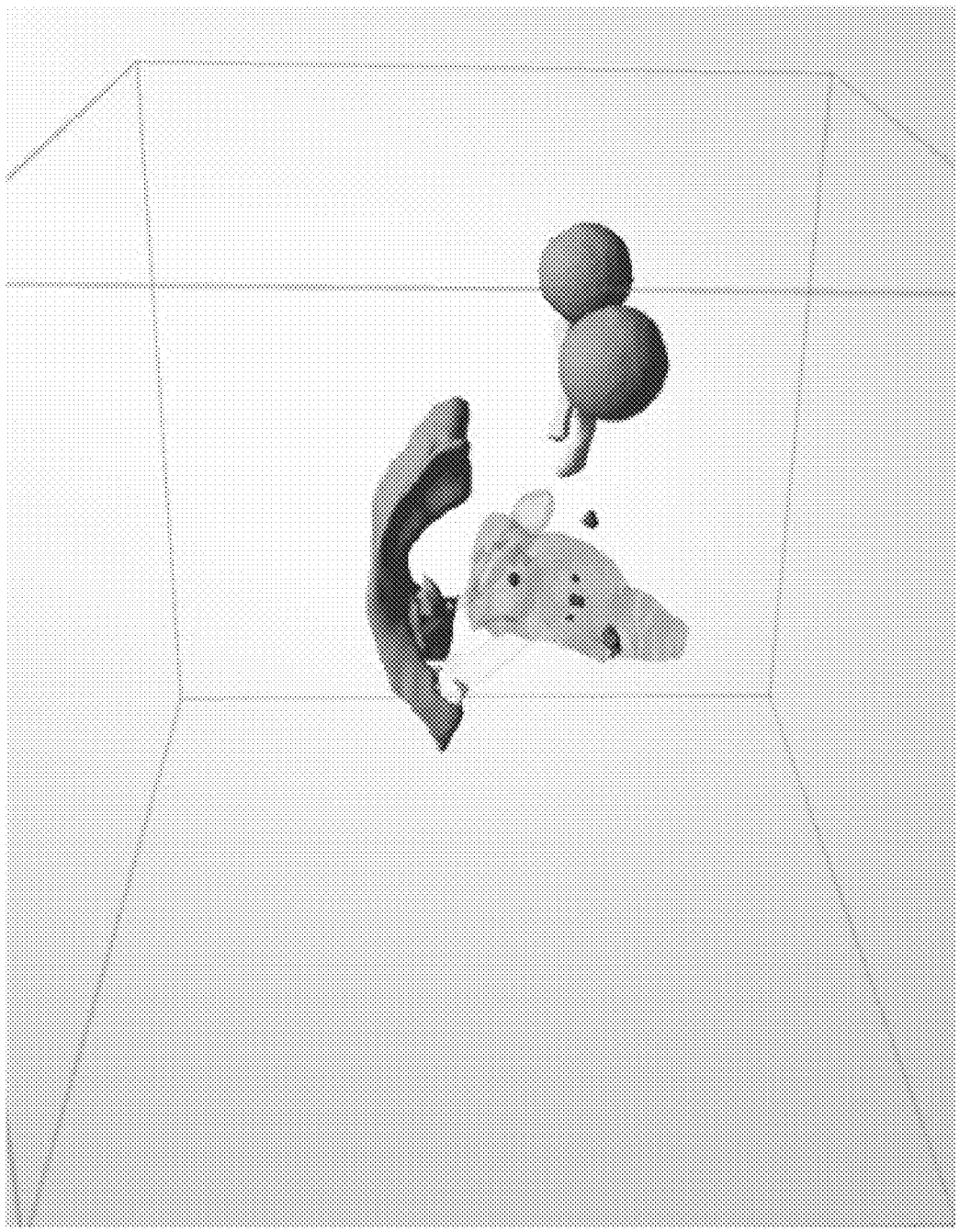
FIGS. 5A-5C illustrate a virtual model of brainstem metastases in accordance with an embodiment of the present disclosure.
Figure 5B:
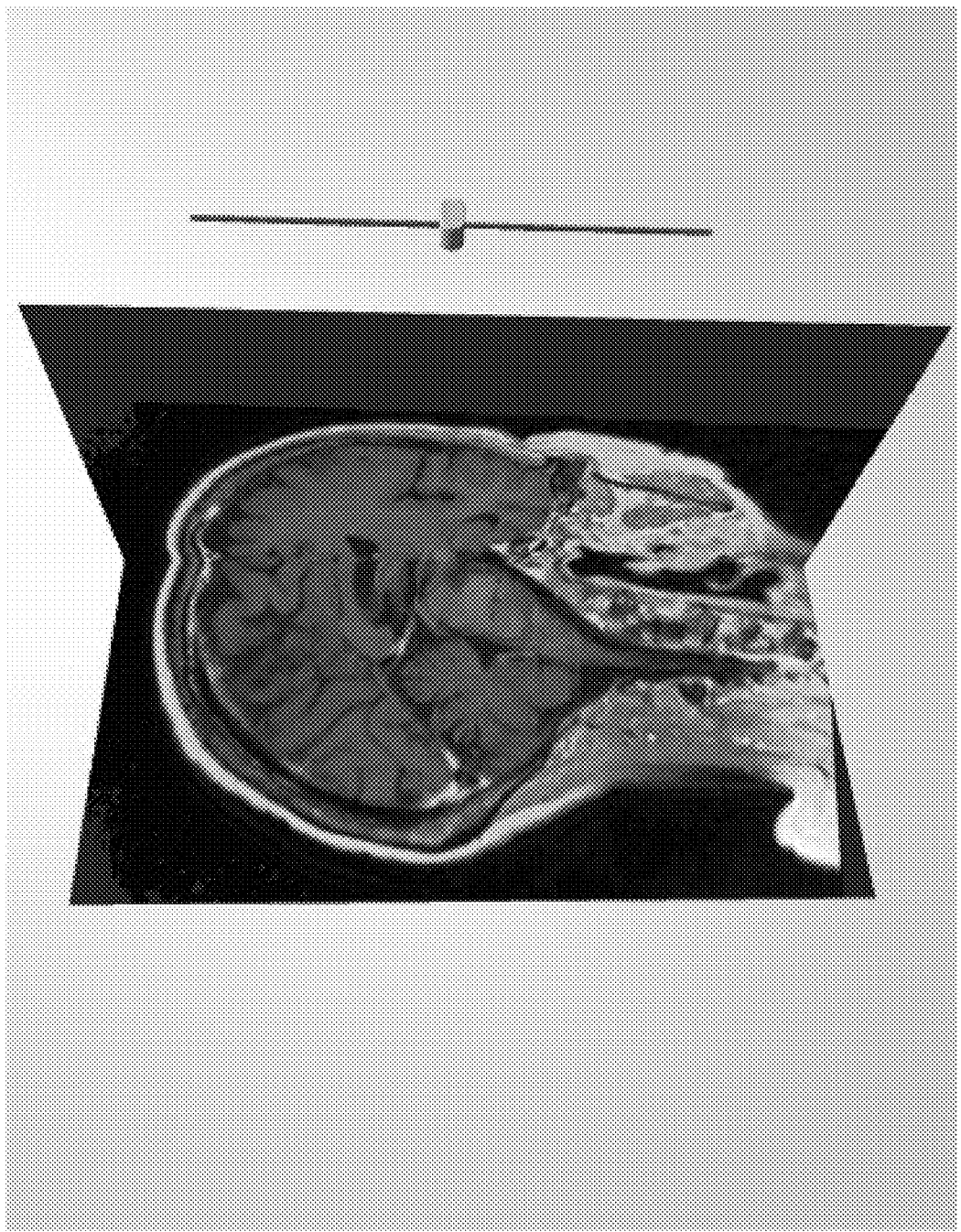
Figure 5C:
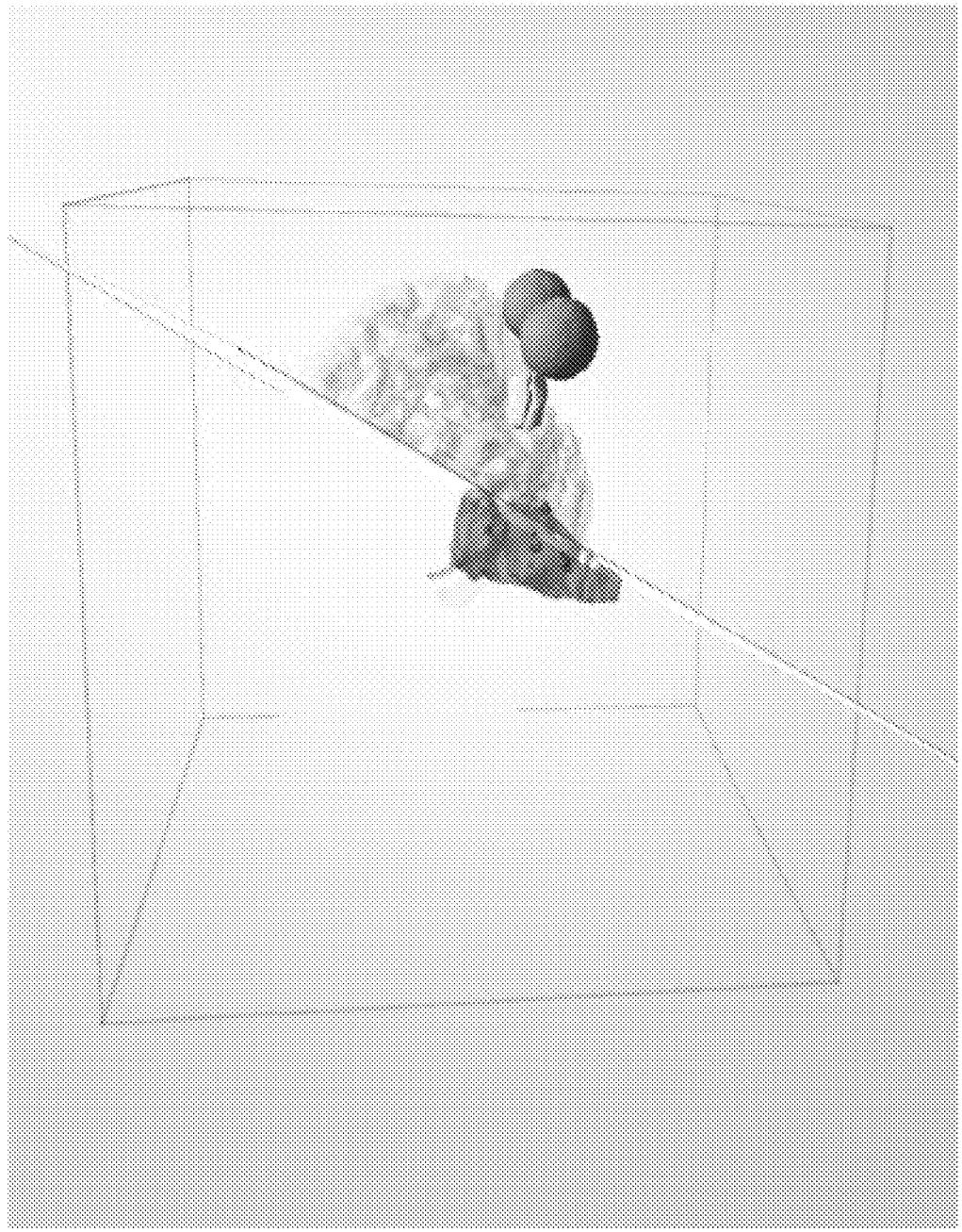

A particularly challenging clinical SRS treatment scenario is that of a patient with single or multiple brainstem metastases. The previously prevalent pessimism regarding the outcomes of patients with metastases in the brainstem, which resulted in the use of whole brain radiation for rather than stereotactic radiosurgery in these patients, has been challenged by the favorable results shown in several single and multi-institutional case series of patients treated with SRS for brainstem metastases. Nevertheless, these remain very challenging cases to plan and treat with SRS given the strict dose constraints associated with the brainstem, a key, intracranial OAR. In case planning discussions for brainstem metastases cases, the 3D orientation, shapes and clustering of small brainstem lesions are often poorly visualized with traditional modalities on a 2D screen. With MR, we can augment the visualization of these cases by the incorporation of several interactive features. For example, the opacity of the brainstem itself can be altered along a gradient on the hologram to allow for clearer understanding of the relationship of the lesions within the brainstem anatomy, as shown in FIG. 5A. Similar to the technique used in other clinical cases, the axial, coronal and sagittal MRI planes can be overlaid with the hologram to better visualize the relationship between the 3D oriented model and 2D MRI contours, as shown in FIG. 5B. Here too, the clipping plane feature allows for delineation of the relationship between contour of the brainstem itself and the lesions within, as shown in FIG. 5C. In addition, by fading the cerebrum, we can gain a greater appreciation of the depth of the lesions and their relationship to the surface anatomy. With the incorporation of MR technology, we can also isolate each brainstem lesion separately to see the natural clusters and evaluate overlap of PTVs. These new ways of manipulating and visualizing these challenging lesions can allow us to optimize the treatment doses and improve the safety of the treatment plan. This way of controlling what you can see with the lesions and the PTVs in a virtual hologram allows us to understand the potential overlap of PTVs and helps optimize the safety of the radiation dose delivered to this critical structure while maximizing the dose delivered to the lesions themselves.

Case Scenario 5: Vestibular Schwannoma

Figure 6A:
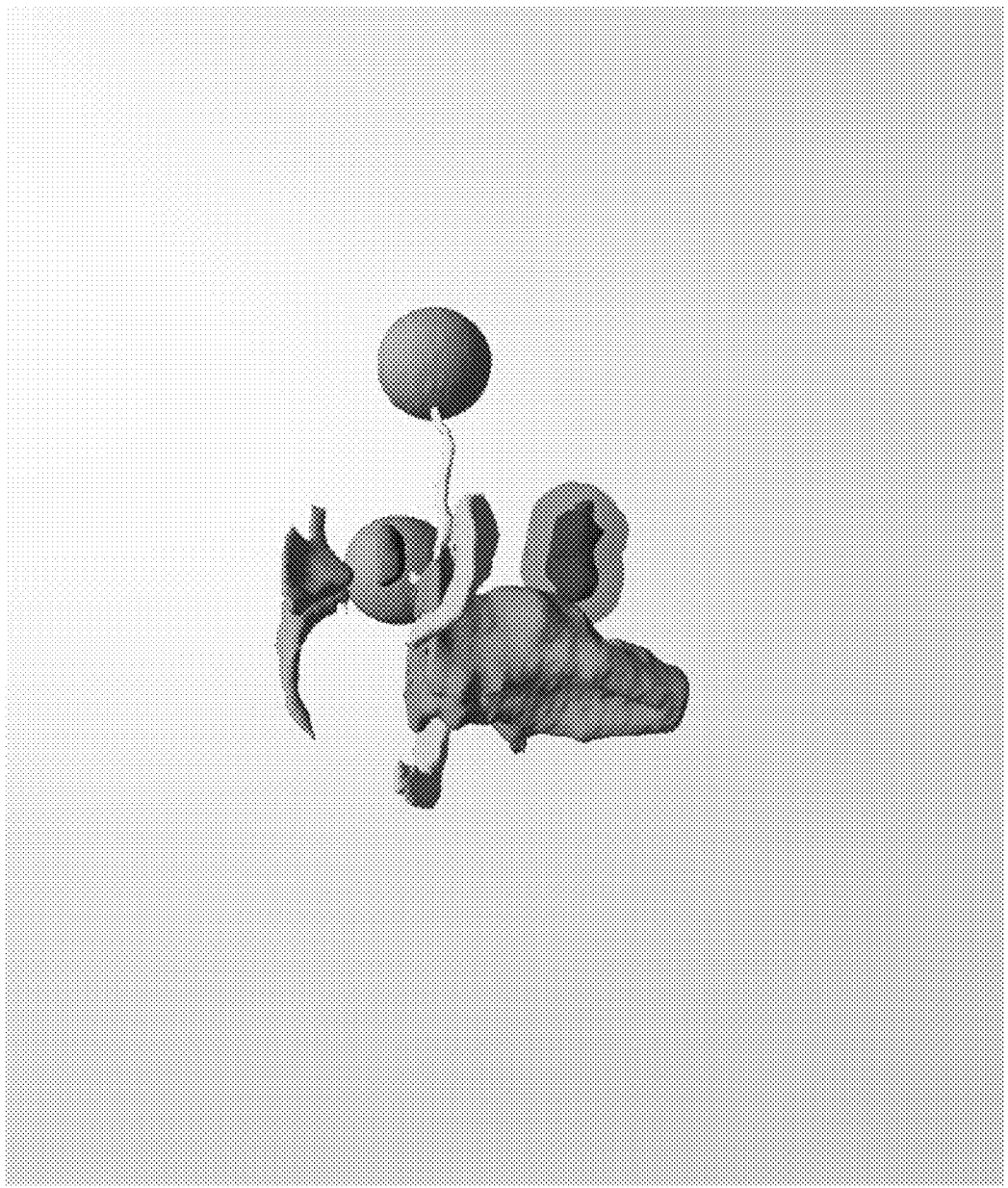
FIGS. 6A-6C illustrate a virtual model of a vestibular Schwannoma in accordance with an embodiment of the present disclosure.
Figure 6B:
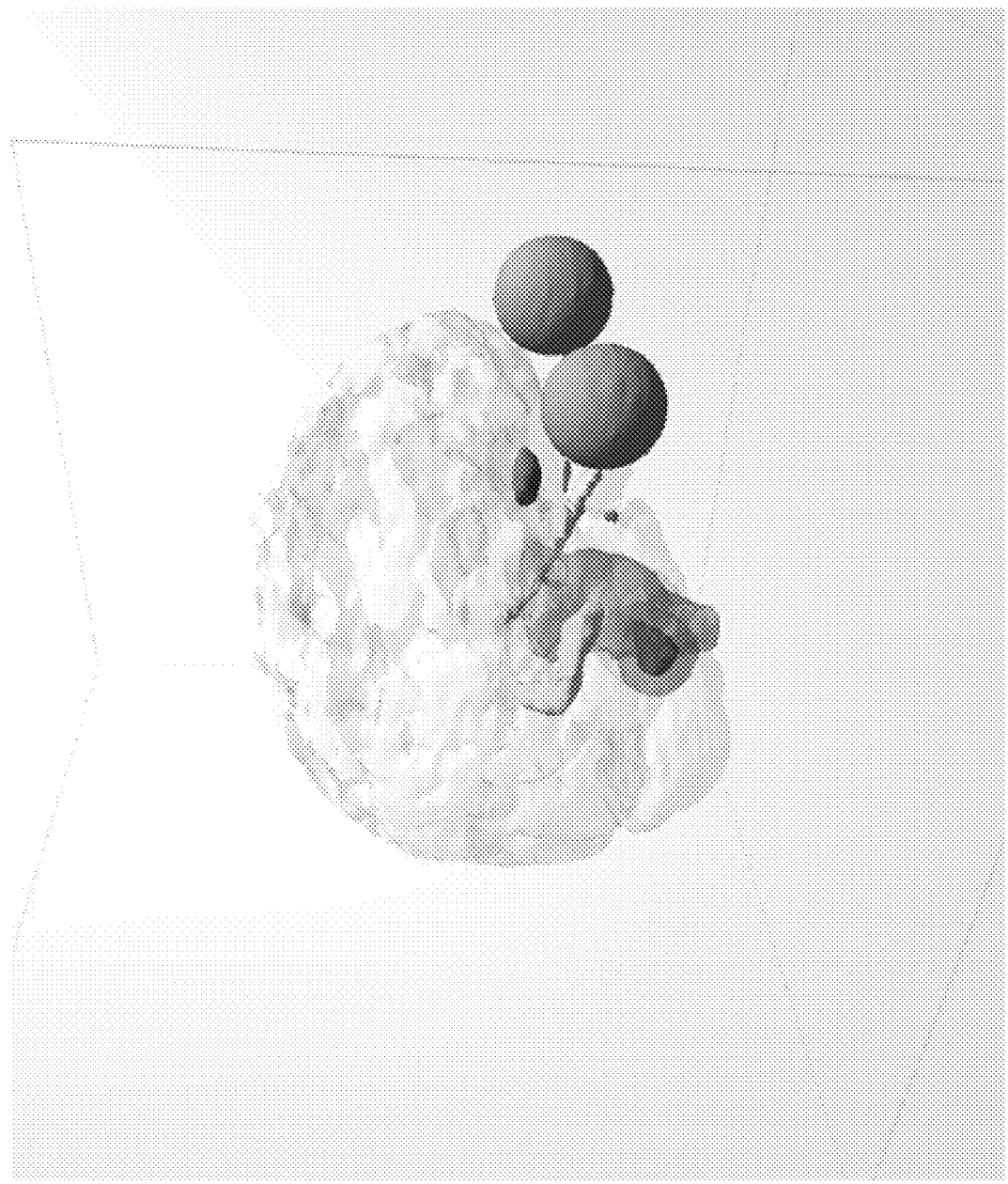

Another lesion that is often treated with SRS is a vestibular schwannoma. Vestibular schwannomas grow at a rate of 0-3.9 mm per year and double in volume between 1.65 and 4.4 years. SRS arrests vestibular schwannoma growth in up to 98% of patients studied at intervals of 10-15 years. Current studies indicate that 3-5 years after single fraction radiosurgery, 61%-80% of patients maintain useful hearing compared to gradually decreasing hearing function leading to the loss of useful hearing by 5 years in most patients who undergo observation. Another published study argued that delayed hearing loss after SRS for vestibular schwannomas is an important issue and that the minimal dose of radiation that the cochlear volume is exposed to is a predictor of this delayed hearing loss. Limiting radiation dose to cochlea during SRS has been shown to be important in hearing preservation in these cases. Merging the use of MR in these planning discussions enhances our ability to visualize the shape and contour of these lesions and their PTVs and allows to better understand their proximity to the cochlea to facilitate planning discussions. As skull base lesions, vestibular schwannomas are in a unique location that presents distinct challenges in SRS case planning. Firstly, isolating a holographic depiction of the lesion and PTV allows us to see its proximity to the brainstem and cochlea, the closest OARs, as shown in FIG. 6A. Similar to the case of the multiple brainstem metastases, the deep-seated location of a vestibular schwannoma can be better understood with by changing the opacity of the overlying cerebrum to further elucidate the relationship between this lesion and its surrounding structures, as shown in FIG. 6B. Adding the MRI planes also augments our ability to identify potential surgical corridors if surgery is still under consideration for a patient as a potential treatment option, shown in FIG. 6C.

Case Scenario 6: Intraventricular Lesion

Figure 7A:
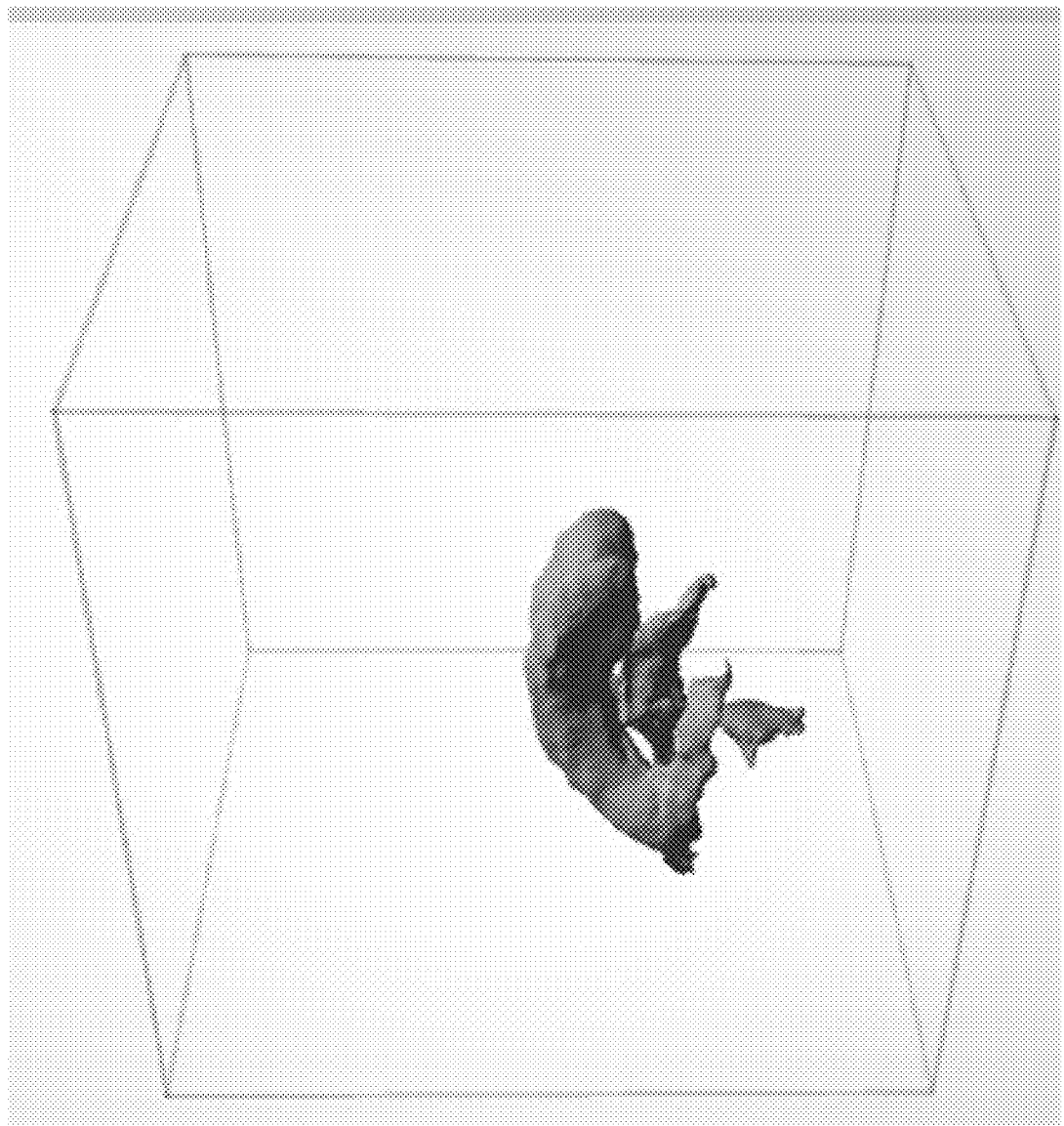
FIGS. 7A-7C illustrate a virtual model of an intraventricular tumor in accordance with an embodiment of the present disclosure.
Figure 7B:
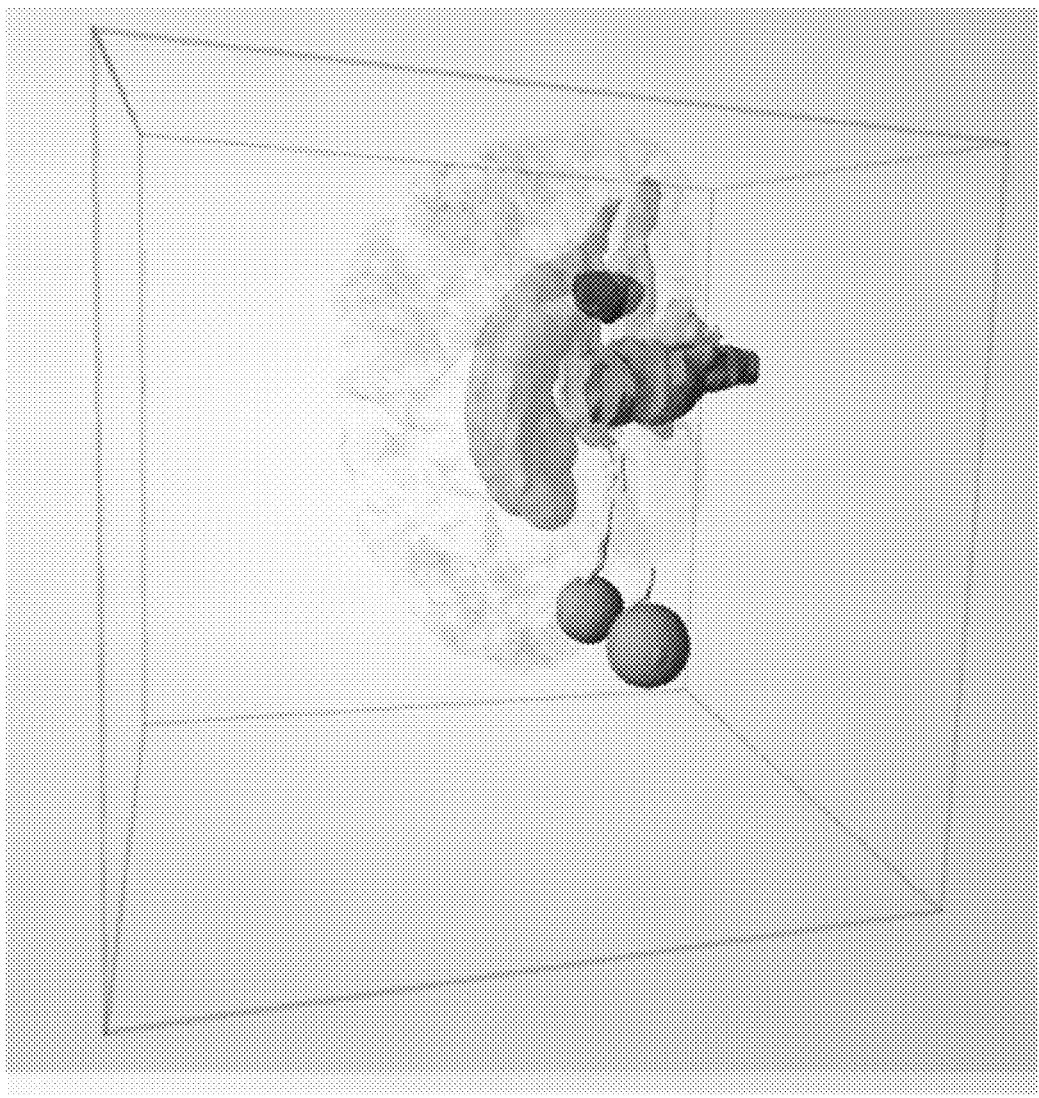

Lastly, we describe the use of MR in case planning for SRS for intraventricular lesions. In a published 2014 study, with a median follow-up of 11.4 months, the rate of crude local control after SRS for 30 intraventricular metastases in 25 patients was 93.3% a median overall survival after SRS of 11.6. This study showed excellent local control for intraventricular metastases treated with SRS, with acceptable treatment-related toxicity, thereby supporting nonsurgical treatment for these lesions. In planning radiosurgery for intraventricular lesions, we have to acknowledge that the lateral ventricles are complex semicircular structures that are often poorly understood by viewing on a 2D radiograph. A 3D, holographic representation of the ventricle is thus inherently useful in understanding its anatomy, as shown in FIG. 7A. When combined with various MRI planes, this visualization of the intraventricular pathology can be further enhanced using MR technology. Fading the opacity of the ventricles allows us to see the extent of the lesions and the voluminal occupancy of the ventricle in 3D space, as shown in FIG. 7B. Furthermore, the clipping plane may allow the connection between the surface anatomy and the lesion clearer for the viewer.

This case example demonstrates some new challenges that arise in terms of segmenting the MRI scans to create a 3D model. This particular example was of an intraventricular meningioma was that was heterogeneously enhancing on MRI which complicated the 3D segmentation of the ventricle, as shown in FIG. 7A. This hurdle in creating an accurate 3D hologram in this case can be mostly overcome by manually segmenting the ventricle and lesion using the tools available on 3D slicer.

FIG. 1 illustrates an exemplary virtual or augmented reality device in accordance with an embodiment of the present disclosure.

FIGS. 2A-2B illustrate magnetic resonance imaging (MRI) scans of a head in accordance with an embodiment of the present disclosure. FIGS. 2C-2F illustrate a virtual model of stereotactic radiosurgery (SRS) to post-operative resection cavity in accordance with an embodiment of the present disclosure.

FIGS. 3A-3C illustrate a virtual model of a resection cavity with metastasis in accordance with an embodiment of the present disclosure.

FIGS. 4A-4C illustrate a virtual model of SRS for multiple brain metastases in accordance with an embodiment of the present disclosure.

FIGS. 5A-5C illustrate a virtual model of brainstem metastases in accordance with an embodiment of the present disclosure.

Figure 6C:
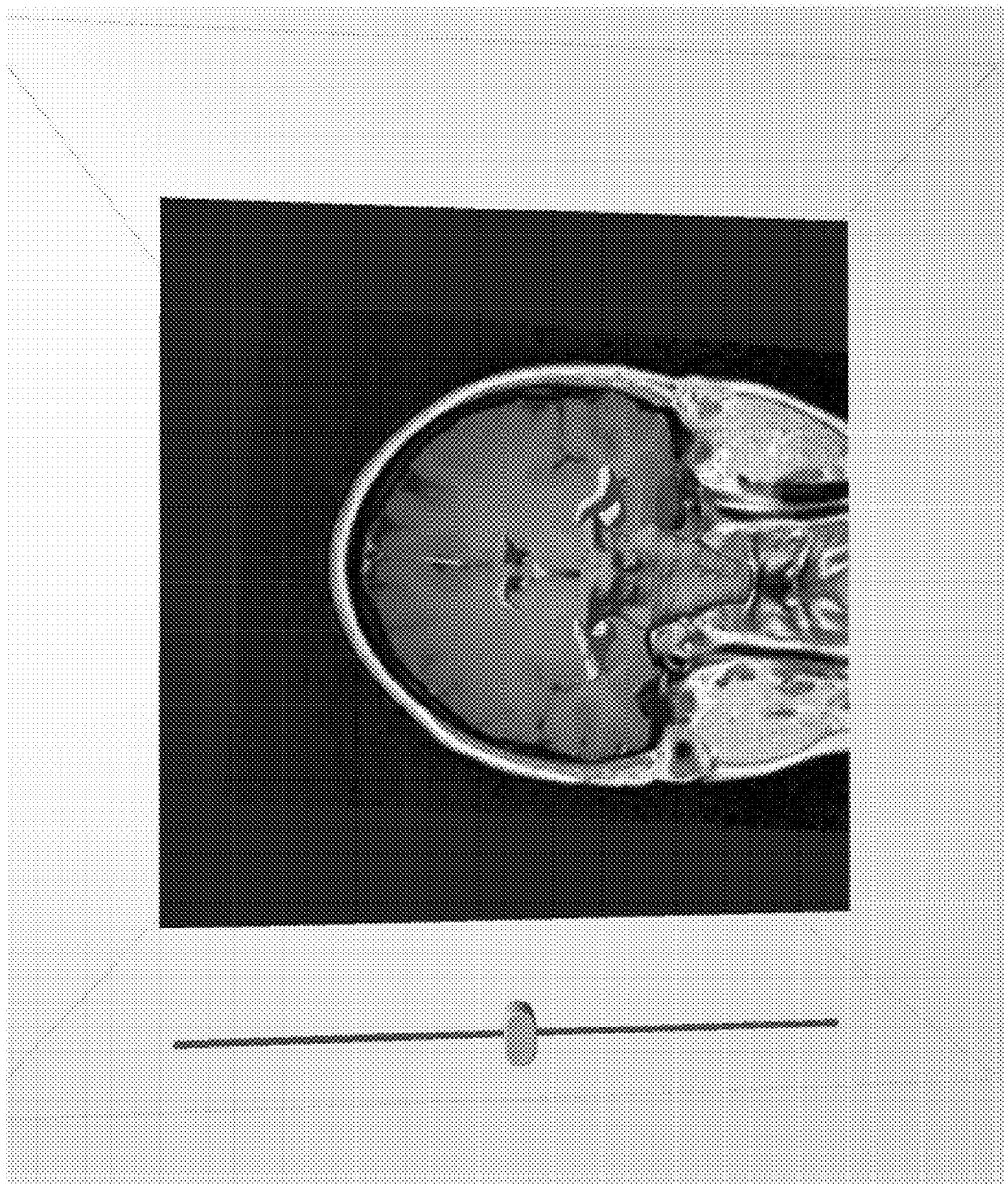

FIGS. 6A-6C illustrate a virtual model of a vestibular Schwannoma in accordance with an embodiment of the present disclosure.

Figure 7C:
Figure 8A:
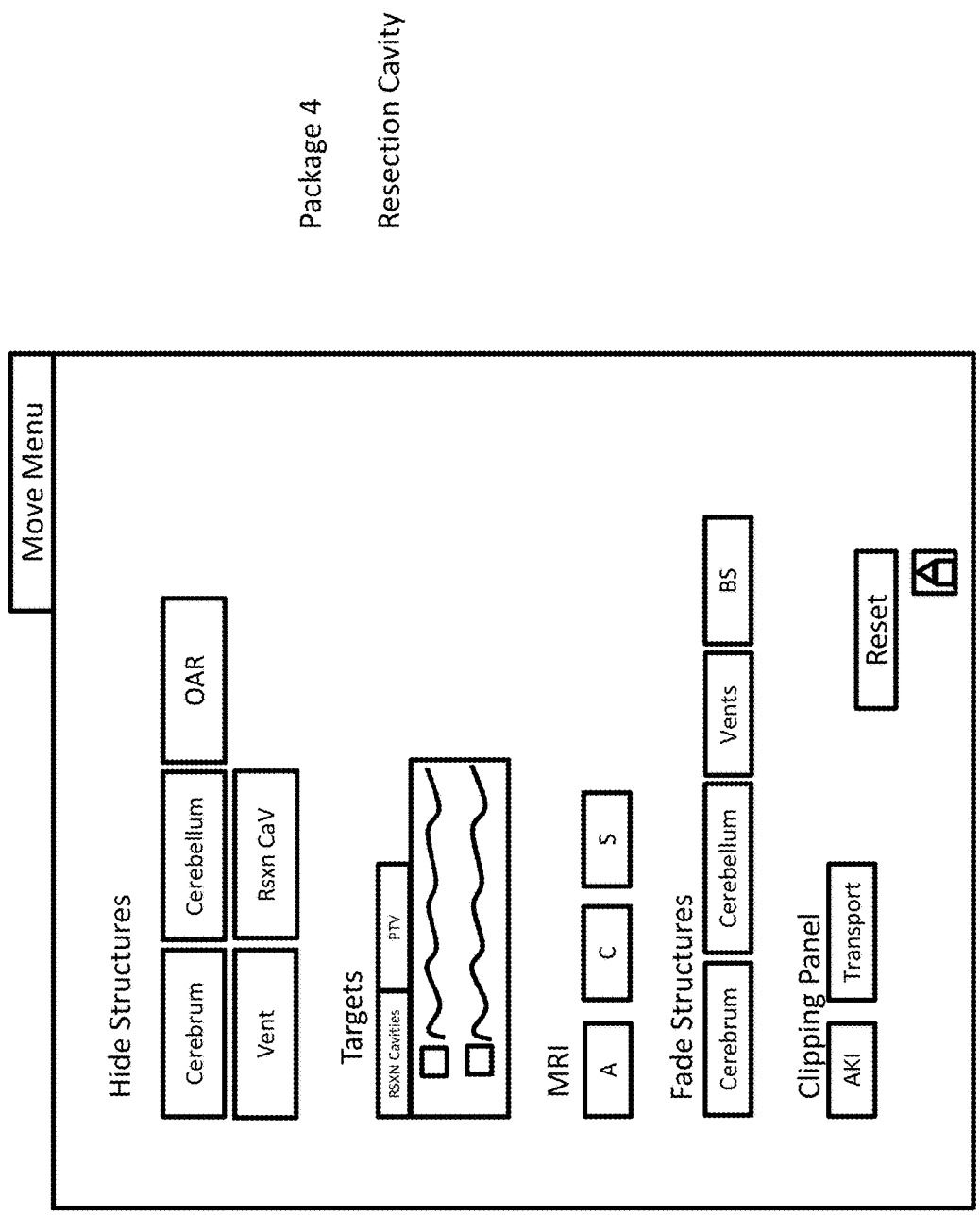
FIGS. 8A-8D illustrate exemplary user interfaces in accordance with an embodiment of the present disclosure.
Figure 8B:
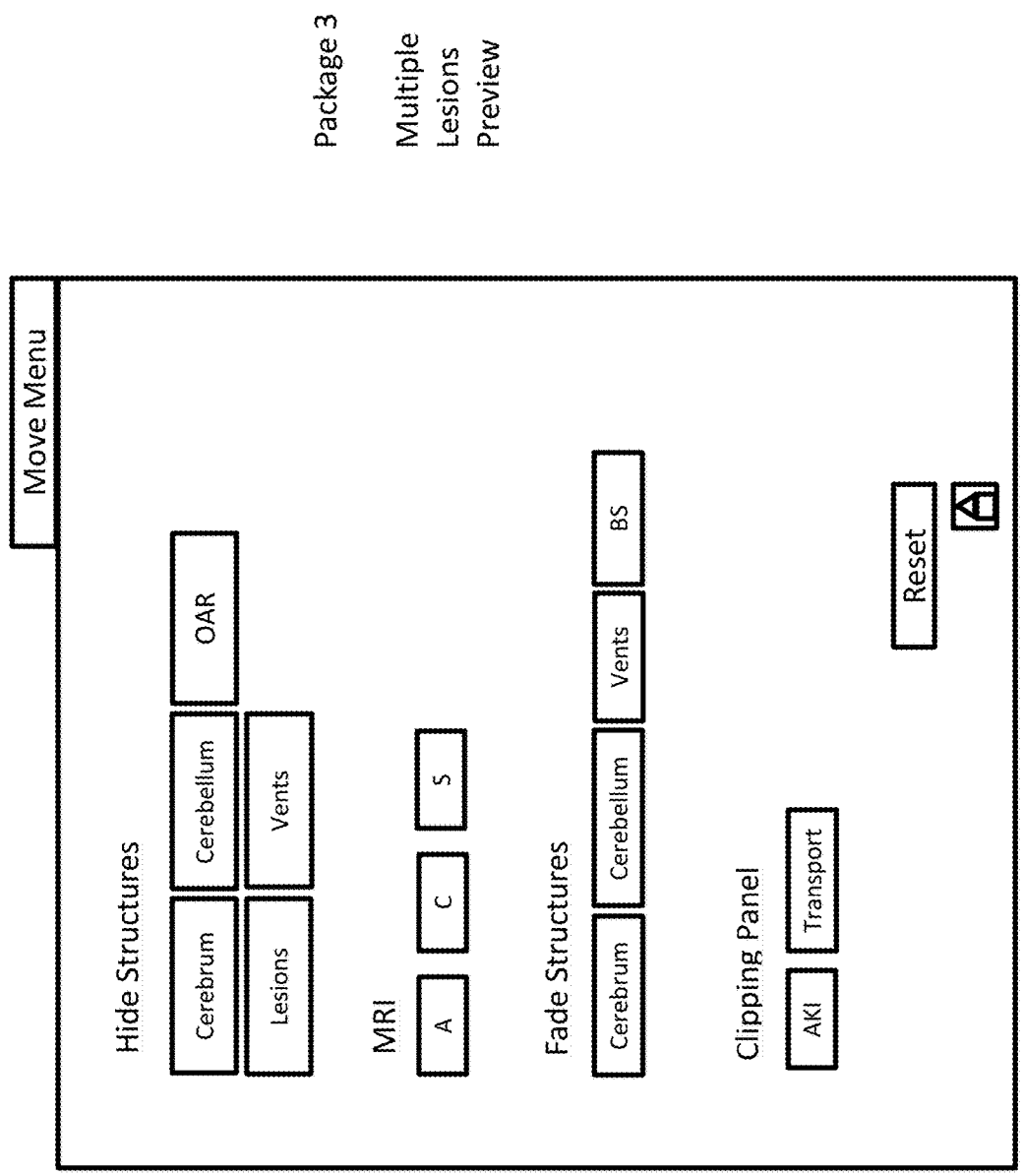
Figure 8C:
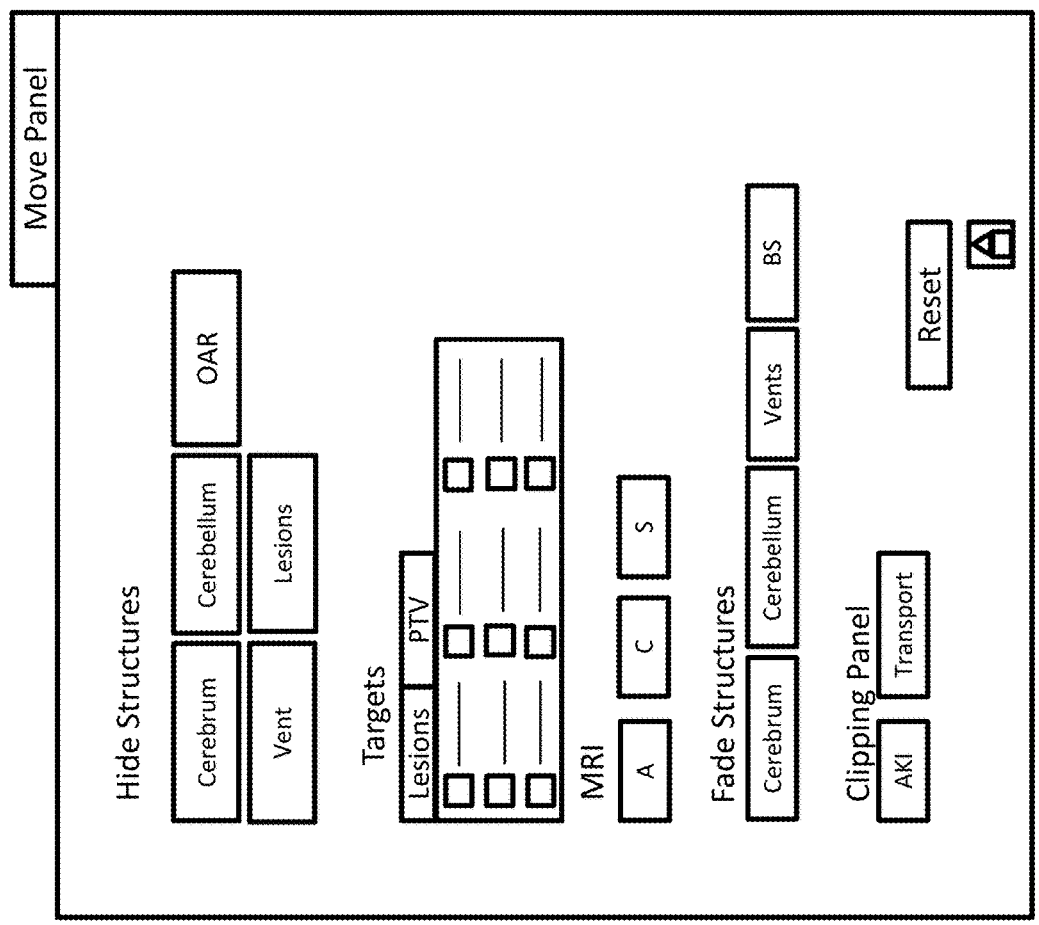
Figure 8D:
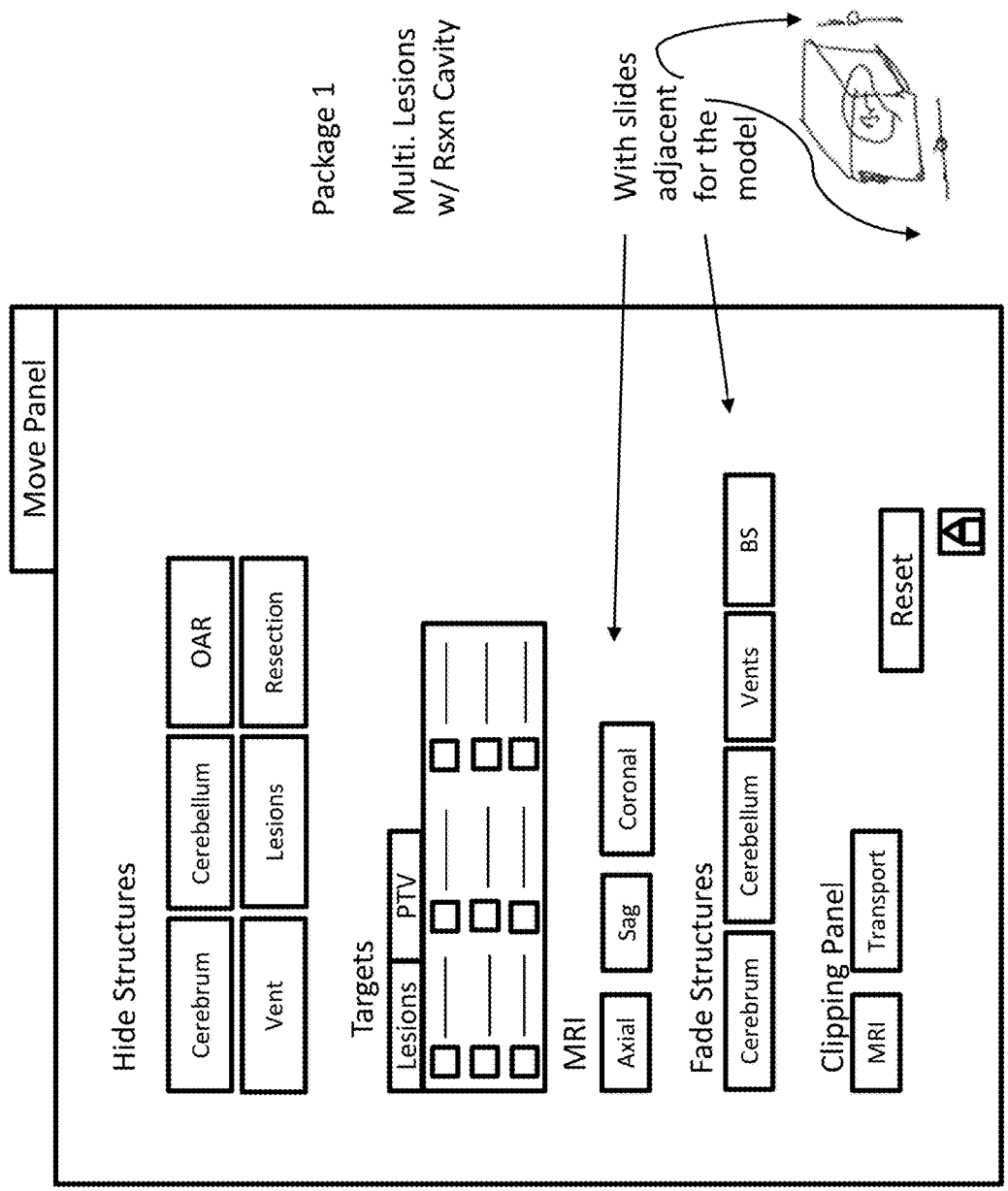

FIGS. 7A-7C illustrate a virtual model of an intraventricular tumor in accordance with an embodiment of the present disclosure.

FIGS. 8A-8D illustrate exemplary user interfaces in accordance with an embodiment of the present disclosure. In particular, these figures display various controls which may be provided within the virtual or augmented reality environment or on a supplemental 2D display. These controls may be selected based on a predetermined treatment or surgery plan, and allow a user to tailor their experience.

Figure 9:
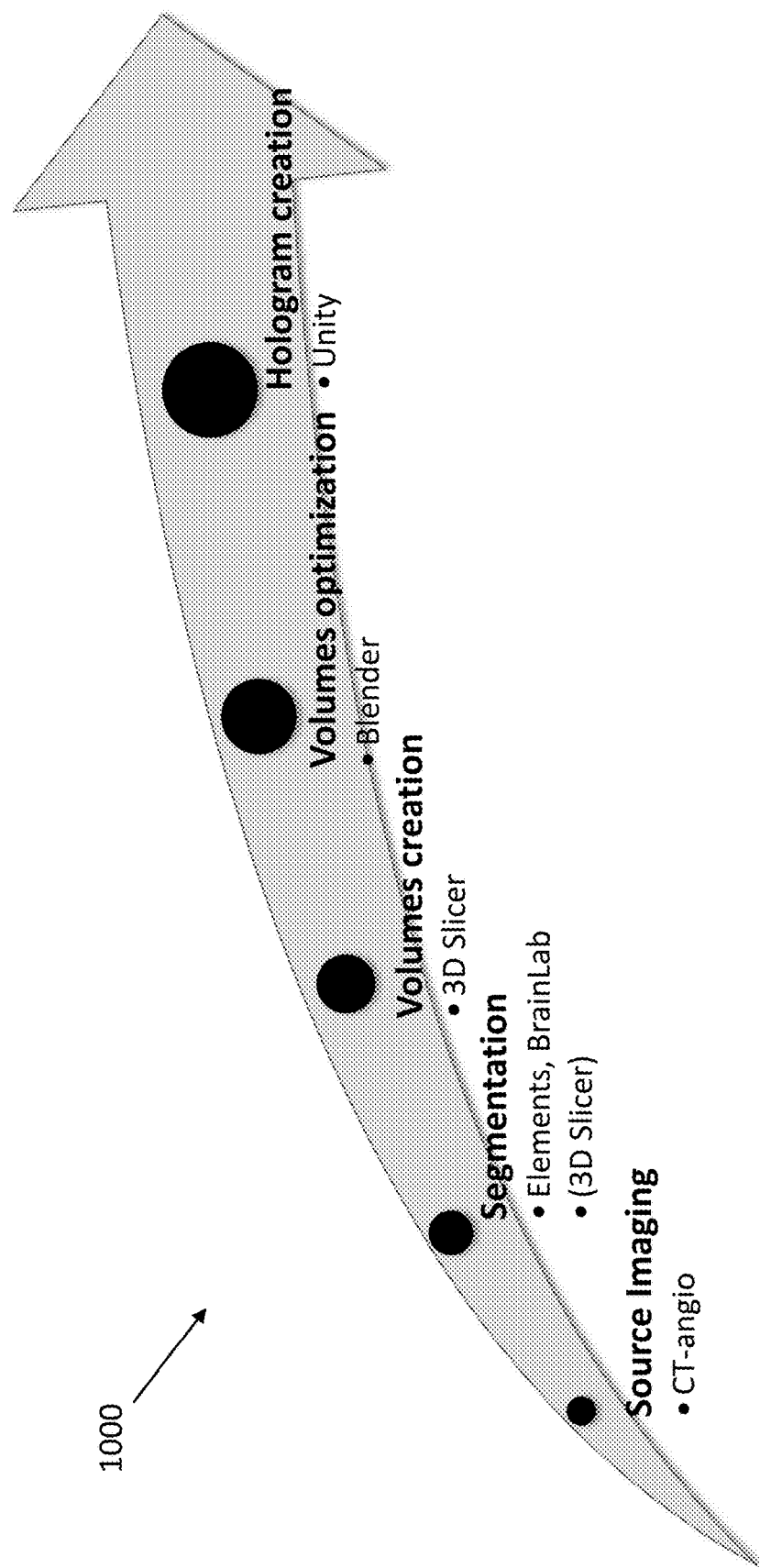
FIG. 9 shows a flowchart of a method of for rendering a three-dimensional anatomical model in a virtual or augmented reality device in accordance with an embodiment of the present disclosure.

FIG. 9 shows a flowchart of a method 900 of for rendering a three-dimensional anatomical model in a virtual or augmented reality device in accordance with an embodiment of the present disclosure.

Figure 10:
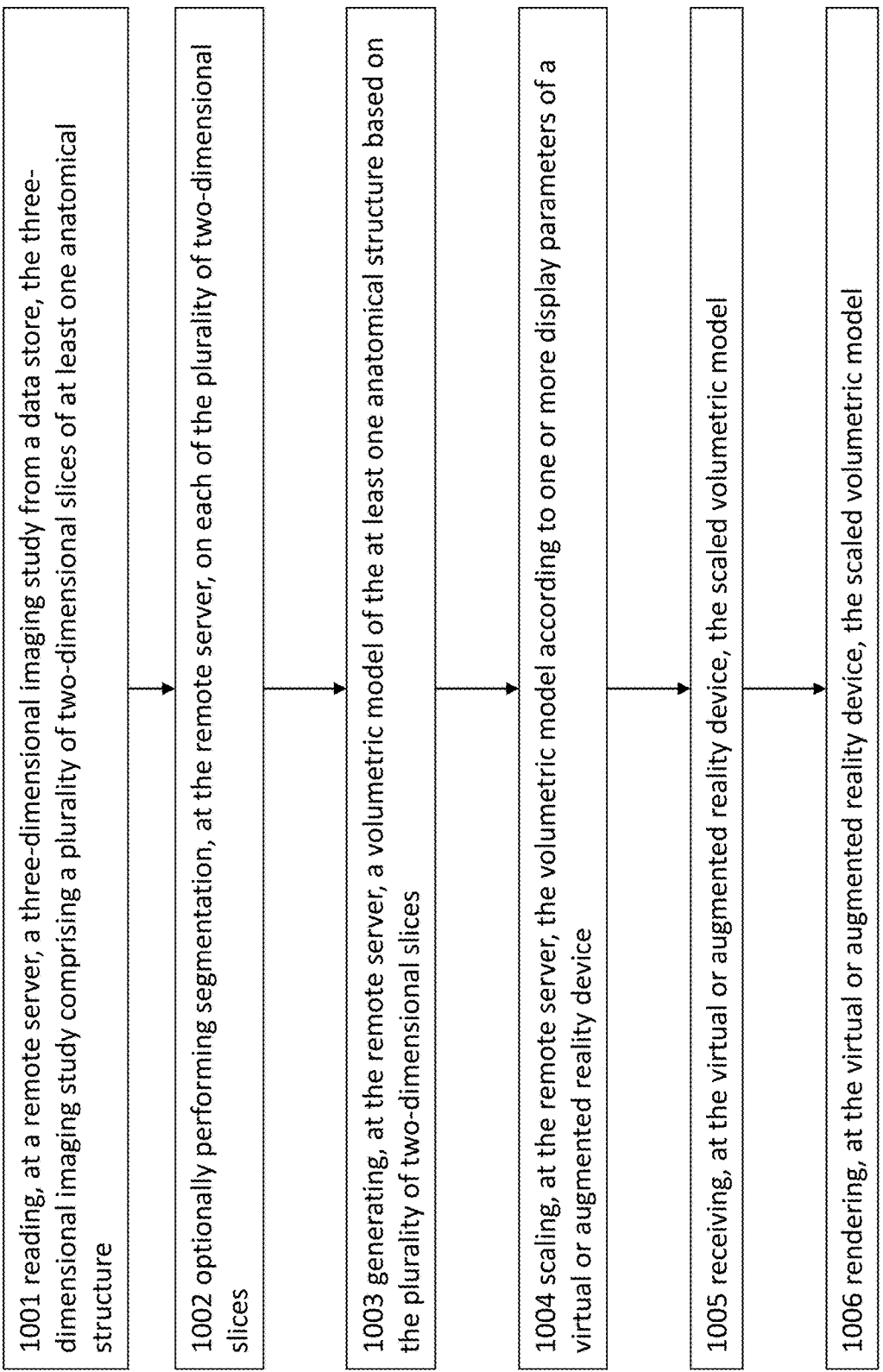
FIG. 10 shows a flowchart of a method of for rendering a three-dimensional anatomical model in a virtual or augmented reality device in accordance with an embodiment of the present disclosure.

FIG. 10 shows a flowchart of a method 1000 for rendering a three-dimensional anatomical model in a virtual or augmented reality device. At 1001, the method includes reading, at a remote server, a three-dimensional imaging study from a data store, where the three-dimensional imaging study includes a plurality of two-dimensional slices of at least one anatomical structure. At 1002, the method includes optionally performing segmentation, at the remote server, on each of the plurality of two-dimensional slices. At 1003, the method includes generating, at the remote server, a volumetric model of the at least one anatomical structure based on the plurality of two-dimensional slices. At 1004, the method includes scaling, at the remote server, the volumetric model according to one or more display parameters of a virtual or augmented reality device. At 1005, the method includes receiving, at the virtual or augmented reality device, the scaled volumetric model. At 1006, the method includes rendering, at the virtual or augmented reality device, the scaled volumetric model.

Example Use Case:

A study was conducted to assess reliability and usefulness of an MR platform in planning the surgical treatment of unruptured intracranial aneurysms (uIAs). Demographic, clinical, and radiological data was collected of 5 patients (1 male and 4 females), harboring a total of 8 uIAs, admitted to a hospital system from March to July 2020 (demographic and radiological data are reported in Table 1). For each patient, a CTA was performed and later used as a data source to build the corresponding holographic model. All models were created successfully within 36 hours. All the aneurysms were accurately reconstructed, except for the middle cerebral artery (MCA) aneurysm of patient 1 due to the insufficient quality of the preoperative CTA. All cases were discussed in advance within an interdisciplinary meeting that included experienced vascular neurosurgeons and interventional radiologists.

TABLE 1

Demographic and radiological data

| Patient | Sex | Age (years) | Location | Dimensions of neck/dome (mm) | Successful MR rendering |
|---|---|---|---|---|---|
| 1 | M | 71 | ACom | 4/8 | Yes |
|   |   |    | Right MCA | 2.6/4 | No |
| 2 | F | 75 | ACom | 4.8/9 | Yes |
| 3 | F | 71 | ACom | 4/5 | Yes |
| 4 | F | 44 | Left MCA | 1.7/3.4 | Yes |
|   |   |    | ACom | 5/5.5 | Yes |
|   |   |    | Left car-opht | 3/2.5 | Yes |
| 5 | M | 71 | ACom | 6.5/6 | Yes |

ACom: anterior communicating artery;
car-opht: ophthalmic segment of the internal carotid artery;
MR: mixed reality;
MCA: middle cerebral artery.

A holographic model may result in more realistic visualization than the conventional imaging to preoperatively plan the clipping strategy of a uIA. All participants, including experienced cerebrovascular surgeons, attendings, and residents, used the MR application during preoperative planning to visualize the neurovascular anatomy and choose the surgical position and approach. Then, the participants were asked to fill out a 5-point Likert-scale questionnaire including 14 items, surveying different aspects about the use of the device: maneuverability and comfort, graphic performance, utility in planning, utility during surgery, and utility in the clinical and academic practice. At the end of the survey, participants were permitted to express any further feedback or suggestion. The participants did not receive any specific training to use the device in order to avoid any bias in assessing its maneuverability, and there were no time limits.

Image acquisition and analysis: Starting from the CTA scans in DICOM format, a clinically available automatic segmentation software (BrainLab Elements—BrainLab, Feldkirchen, Germany) was used to obtain the 3D model of the head. Furthermore, using an open-source software for medical image processing (3D Slicer—National Institutes of Health, Bethesda, www.slicer.org), the segments of the vessels adjacent to the un-ruptured aneurysms were processed to simplify the final hologram. The exported models were then processed using a 3D computer graphics software (Blender, Blender Foundation, Amsterdam, The Netherlands—www.blender.org).

Mixed-reality app development: The MR content (i.e., the 3D segmented models of the brain and the app menu) was visualized using a commercially available HMD. A custom-designed MR software application was developed using Unity3D environment, a game engine primarily employed for game development and other interactive content. The application was based on a Microsoft-driven project (MRTK version 2.3.0 and Unity 2019.4) that provides a set of components and features to accelerate cross-platform MR app development and ad-hoc developed tools. These tools were framed in an easy-to-use panel, and standard (zooming in/out, rotating/translating) as well as more advanced functionalities (hiding or fading structures, visualizing the preoperative patient CTA co-registered on the 3D model) were included. Moreover, a measurement tool was developed in order to take linear measurements between different points on the surface of selected structures. The user can directly interact with the digital components inside the app with specific hand gestures and voice controls and use all the described tools independently and simultaneously.

Figure 13:
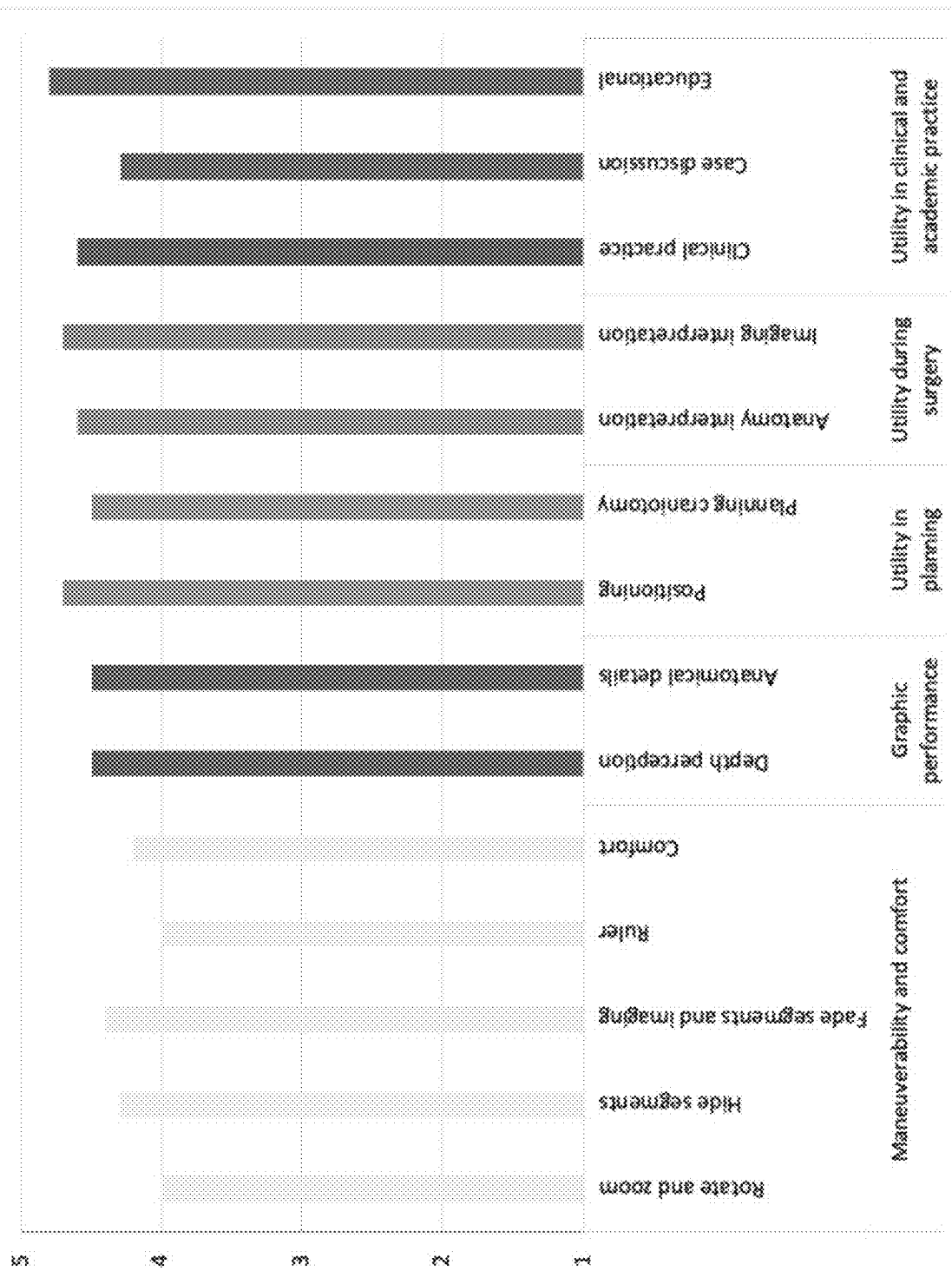
FIG. 13 illustrates results from an evaluation questionnaire in accordance with an embodiment of the present disclosure.

Results: All the members of the operative staff agreed to participate in the study. A total of 3 experienced cerebrovascular surgeons, 1 attending, and 6 residents filled in the evaluation questionnaire. Overall, all the investigated aspects were evaluated as satisfying, as shown in FIG. 13. Participants highly appreciated the utility during surgery, deeming the platform very useful in interpreting the anatomy, in helping the intraoperative orientation, and in correlating the standard neuroimaging to the intraoperative findings. Secondly, the MR application was considered to be helpful for surgical planning: the possibility to freely interact with the holographic 3D model facilitated the positioning of the patient on the surgical table. Furthermore, by modifying the opacity of the segmented anatomical structures, it was possible to see the deep-seated anatomy in transparency. Thus, the planning of the craniotomy was facilitated, and the surgical approach better tailored according to the location of the pathology. The graphic performances were appreciated too, in particular the depth perception and the resolution of the anatomical details.

Figure 14A:
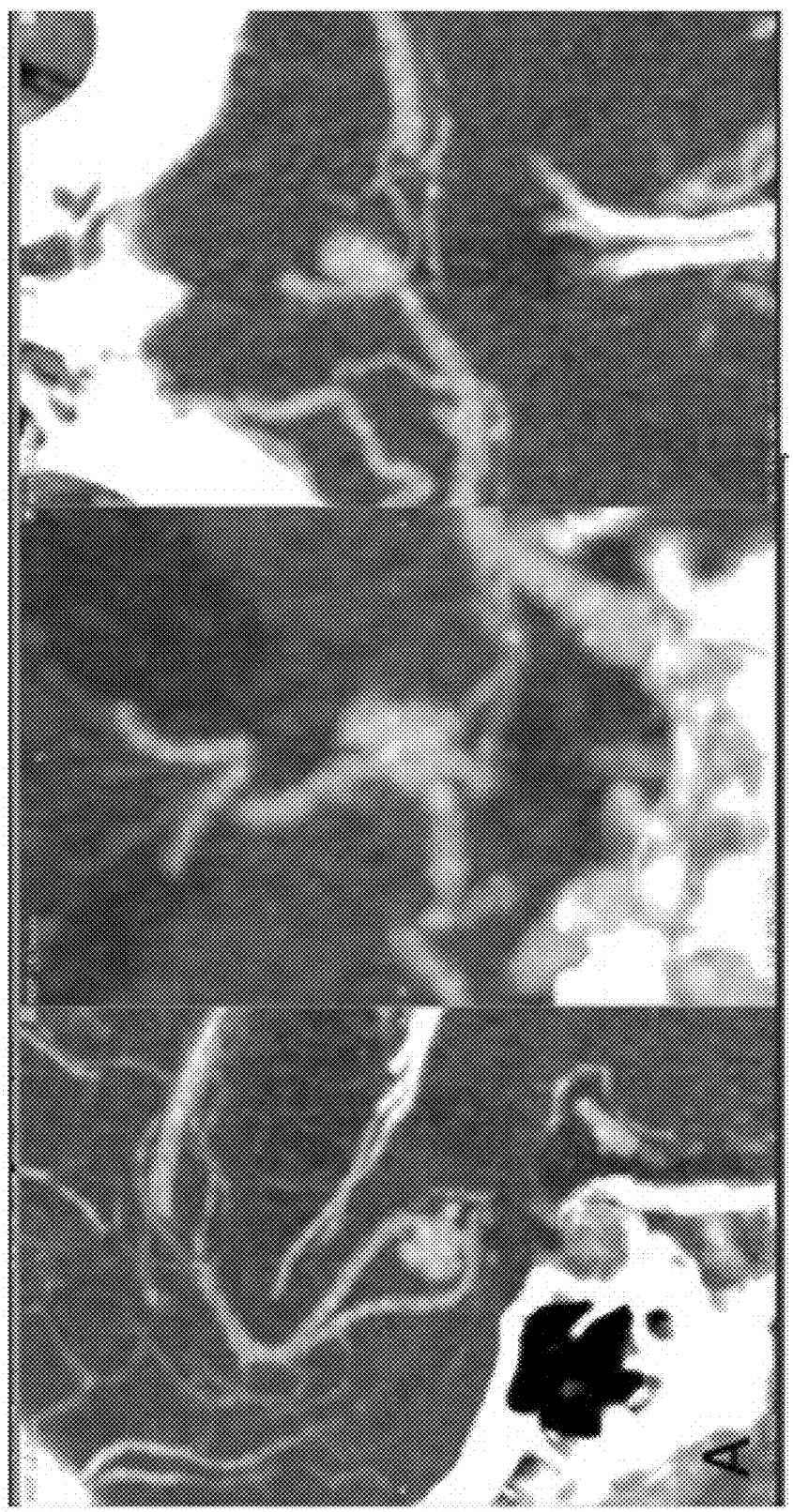
FIGS. 14A-14C illustrates hologram overlaid on patient anatomy in accordance with an embodiment of the present disclosure.
Figure 14B:
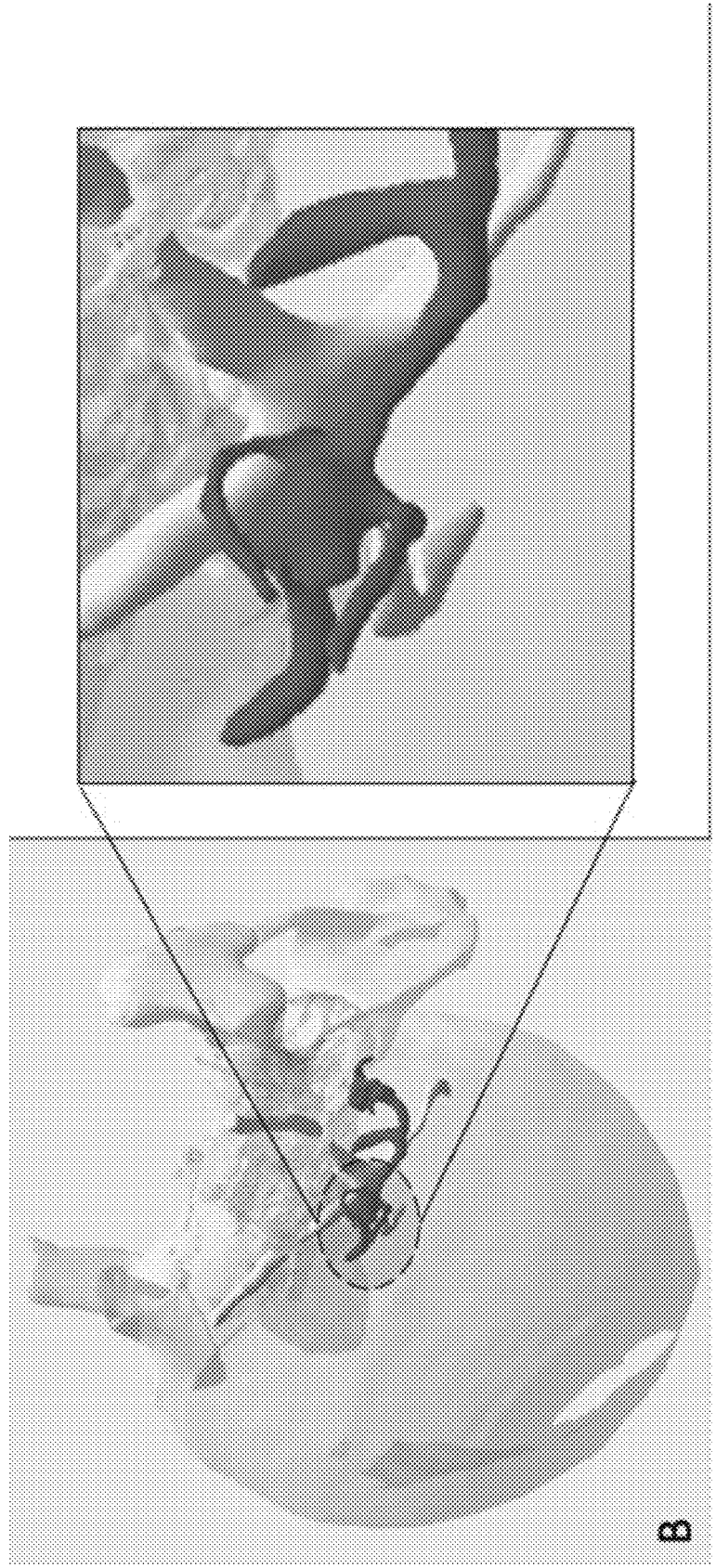
Figure 14C:
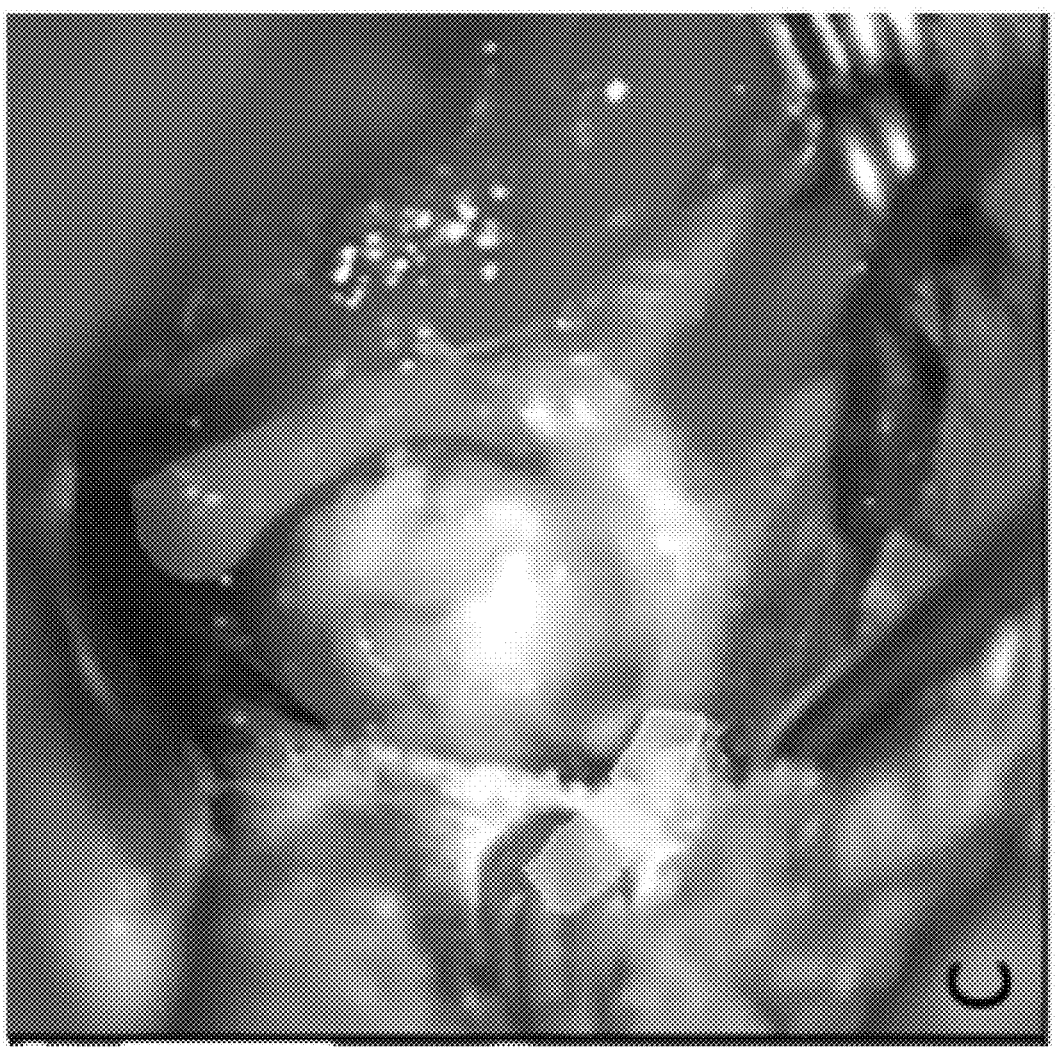

Exemplary Case Reports:

Patient 1: A 71-year-old man who harbored a right MCA and an anterior communicating artery (ACom) aneurysm, with a maximum diameter of 4 and 8 mm, respectively. The ACom aneurysm showed an upward and forward projecting dome, with the ACom complex twisted towards the right side and tilted. The MR application effectively demonstrated the complex anatomy, and the reliability of the hologram was high, as shown in FIGS. 14A-14C. In particular, the MR application enhanced the comprehension of the 3D orientation of the ACom complex. The twist of the vessels on the axial plane and their tilt on the coronal plane is often not easy to understand with traditional imaging modalities, especially with the patient's head in a surgical position. After this planning, both aneurysms were successfully clipped through a right minipterional (MPT) approach.

Figure 15A:
FIGS. 15A-15C illustrates hologram overlaid on patient anatomy in accordance with an embodiment of the present disclosure.
Figure 15B:
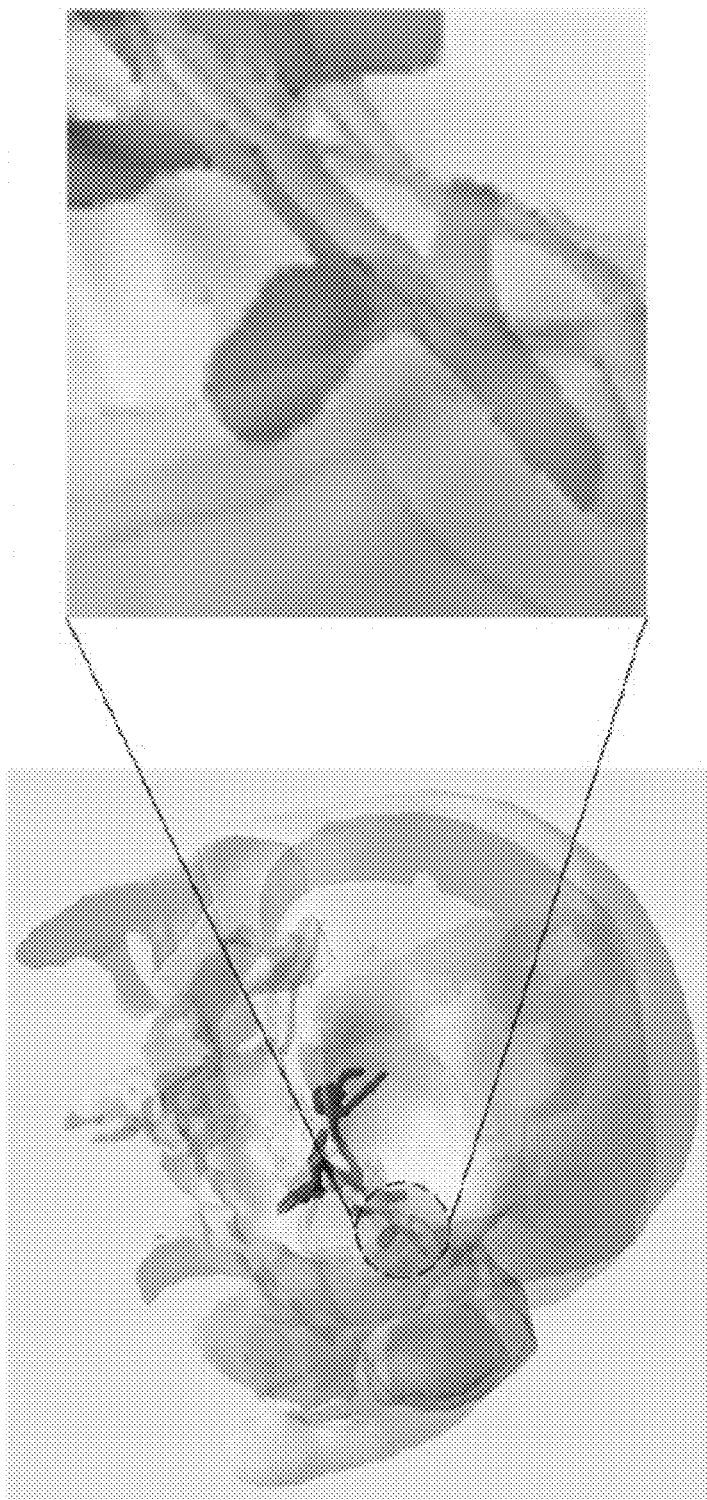
Figure 15C:
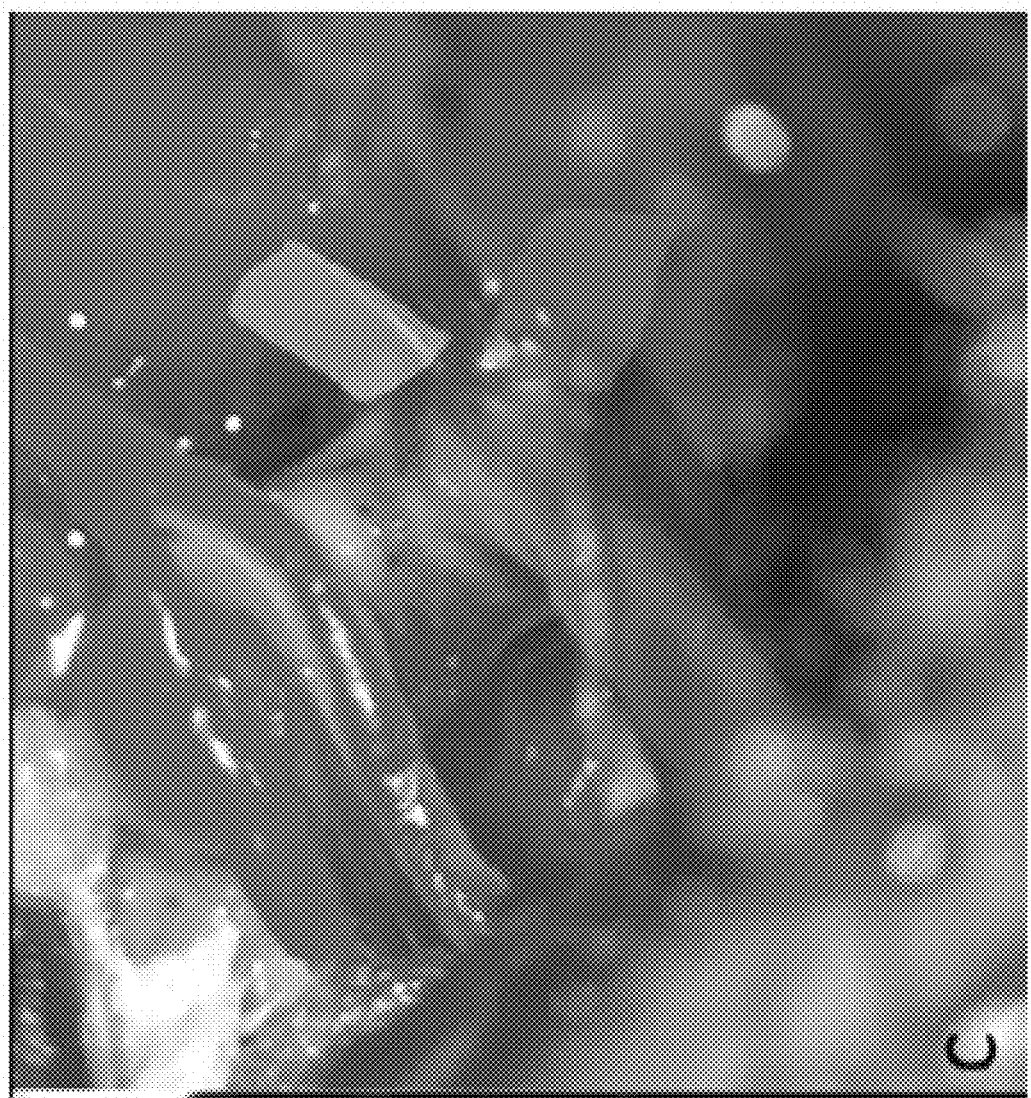
Figure 16A:
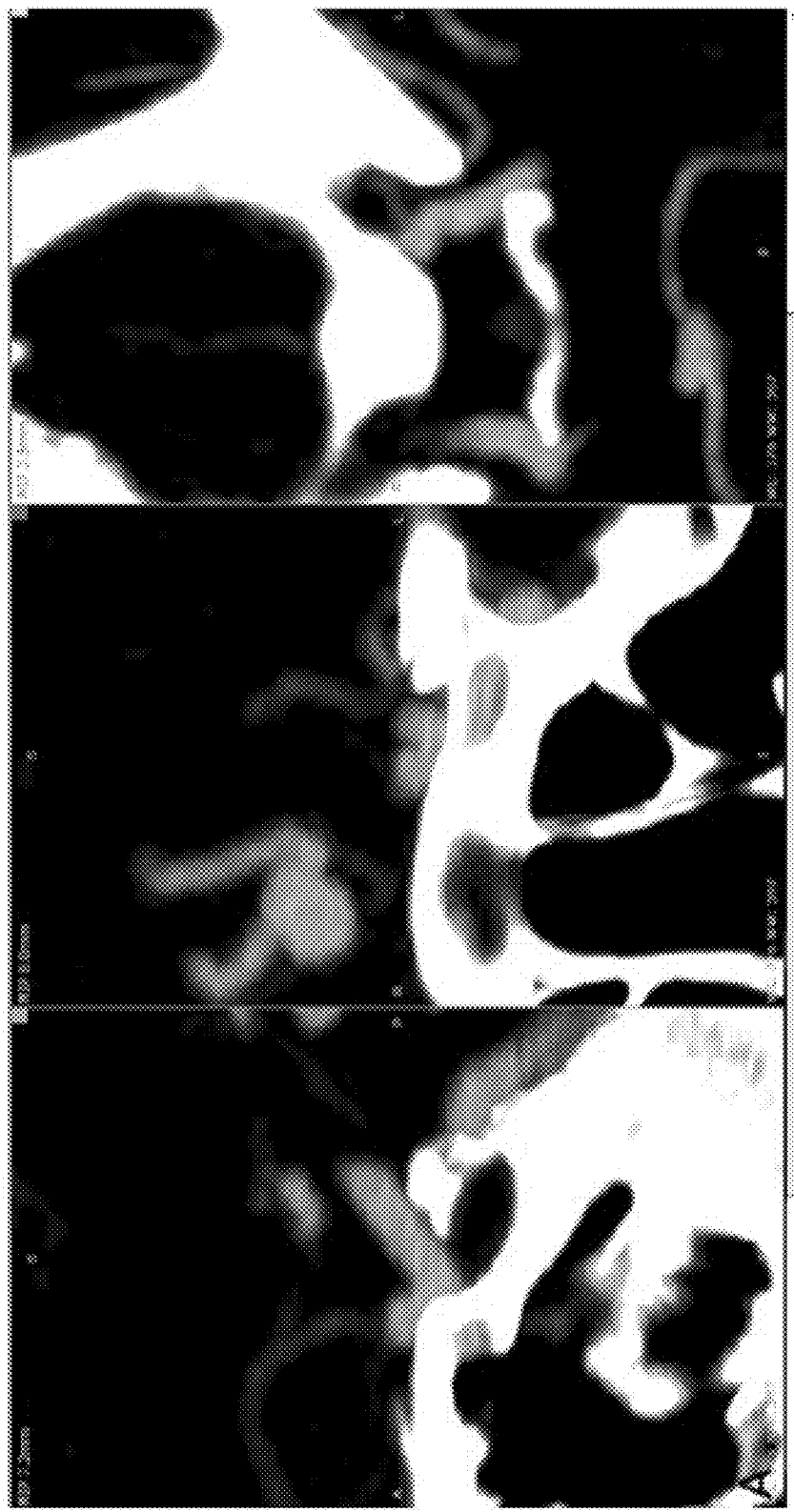
FIGS. 16A-16C illustrates hologram overlaid on patient anatomy in accordance with an embodiment of the present disclosure.
Figure 16B:
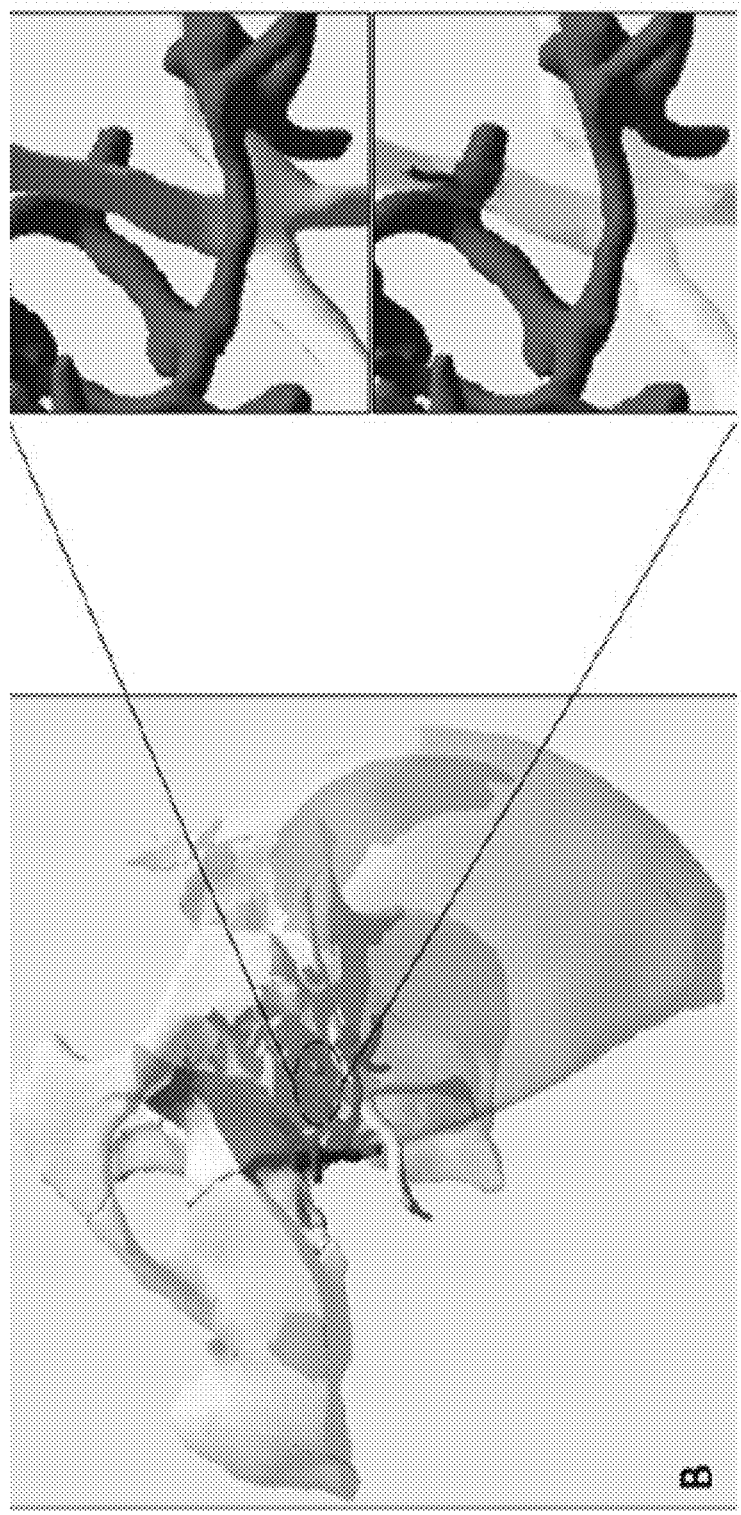
Figure 16C:
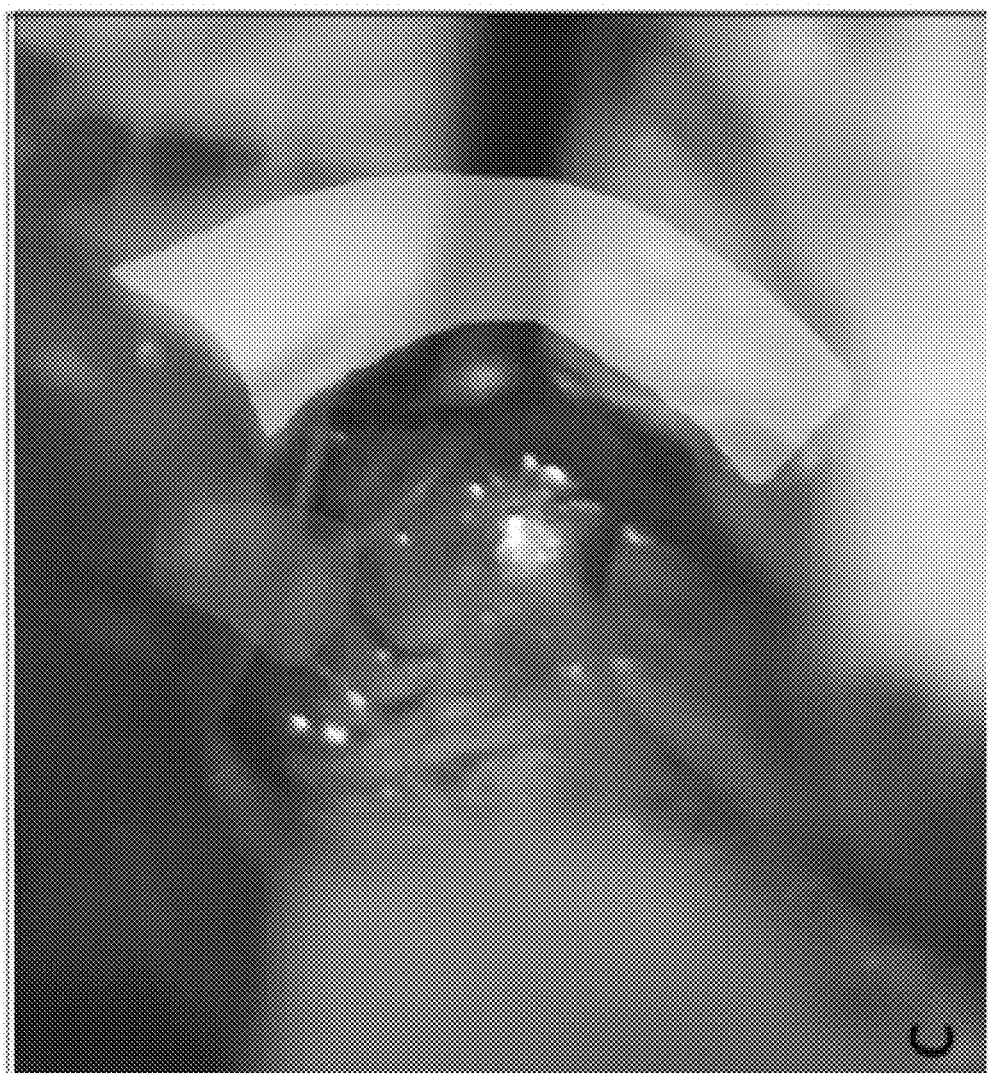

Patient 4: A 44-year-old woman who harbored 3 aneurysms: 1 originating from the left MCA bifurcation, with a maximum diameter of 3.4 mm and a neck of 1.7; 1 from the ipsilateral ophthalmic segment of the internal carotid artery (ICA), with a maximum diameter of 2.5 mm and a neck of 3 mm; and 1 from the ACom, with a maximum diameter of 5.5 mm and a neck of 5 mm. In particular, the MCA aneurysm originated from its temporal branch with a downward projection, as shown in FIGS. 15A-15C. A clear 3D visualization of its projection allowed us to choose a latero-supraorbital (LSO) approach instead of a MPT due to the shortness of the M1 segment proximal to the dome, in order to guarantee early proximal control before the aneurysm exposure. With regards to the carotid-ophthalmic aneurysm, the 3D virtual model showed an unusual medial projection towards the ipsilateral optic nerve, which is uncommon for ophthalmic artery aneurysms, which usually originate from the dorsal surface of the ICA. Moreover, by fading the ipsilateral optic nerve with the MR application, it was possible to visualize the origin of the ophthalmic artery and its relationship with the neck of the aneurysm, as shown in FIGS. 16A-16C. All the aneurysms were successfully clipped through a left pterional approach.

Figure 17A:
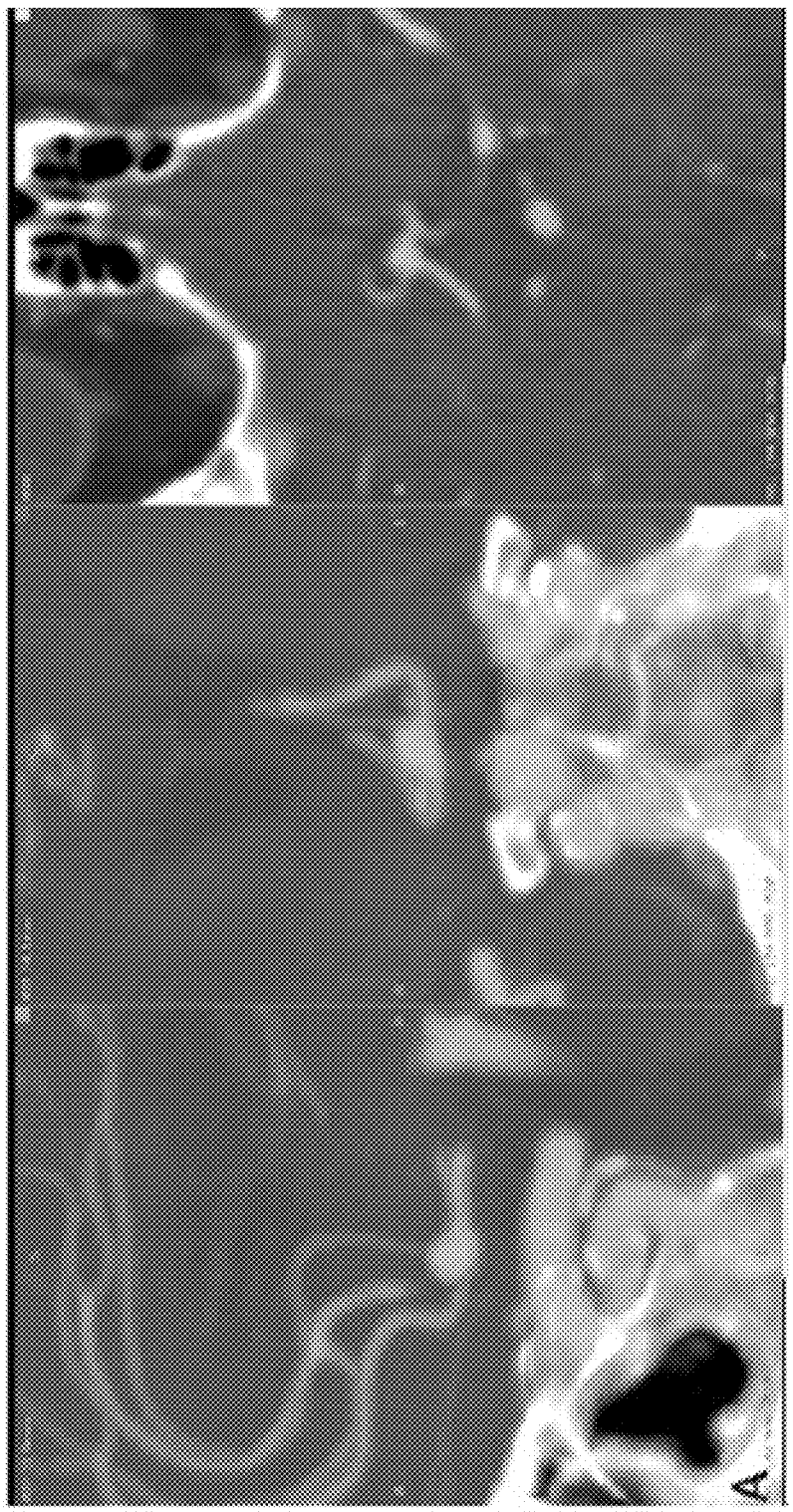
FIGS. 17A-17C illustrates hologram overlaid on patient anatomy in accordance with an embodiment of the present disclosure.
Figure 17B:
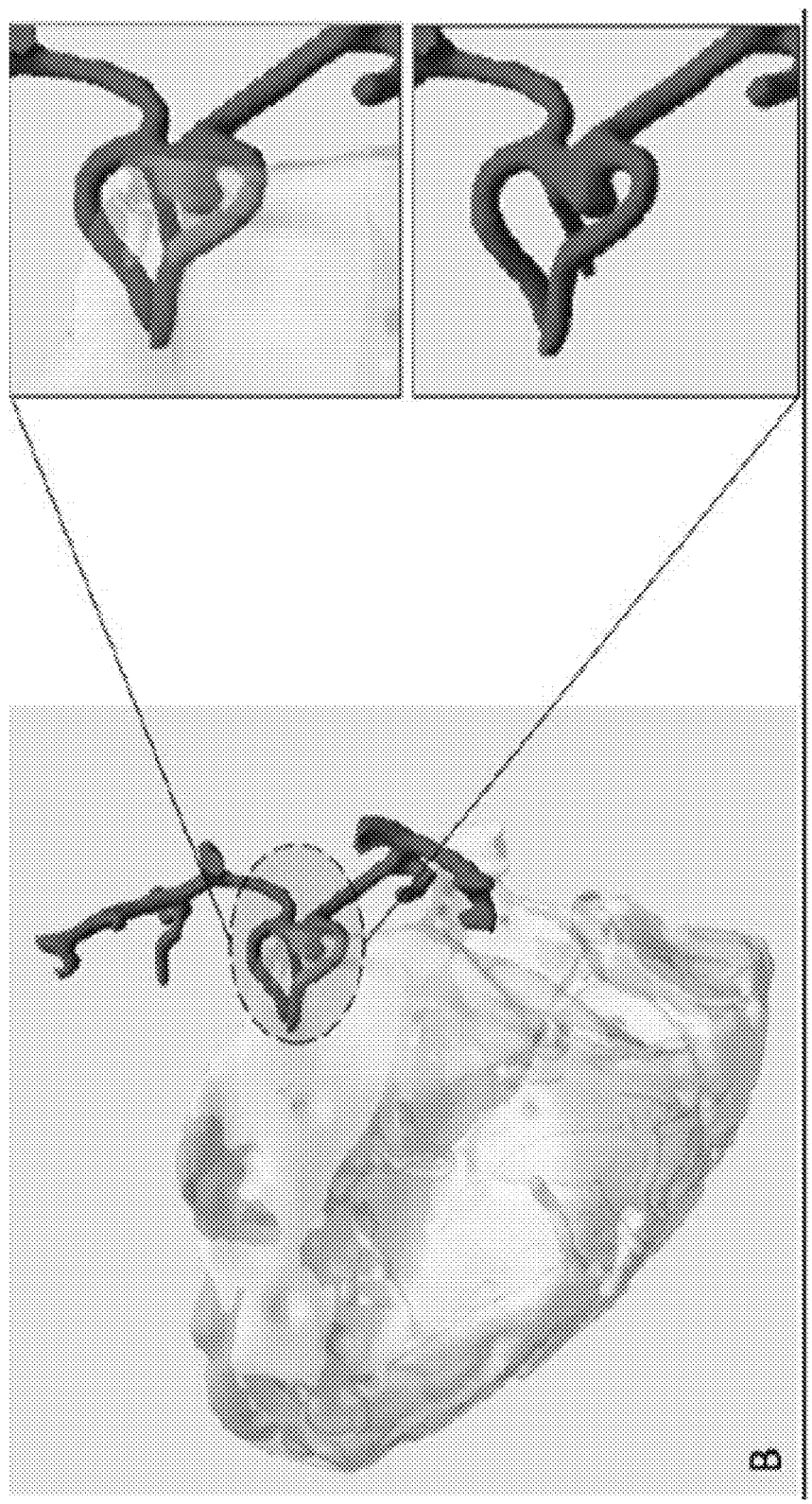
Figure 17C:
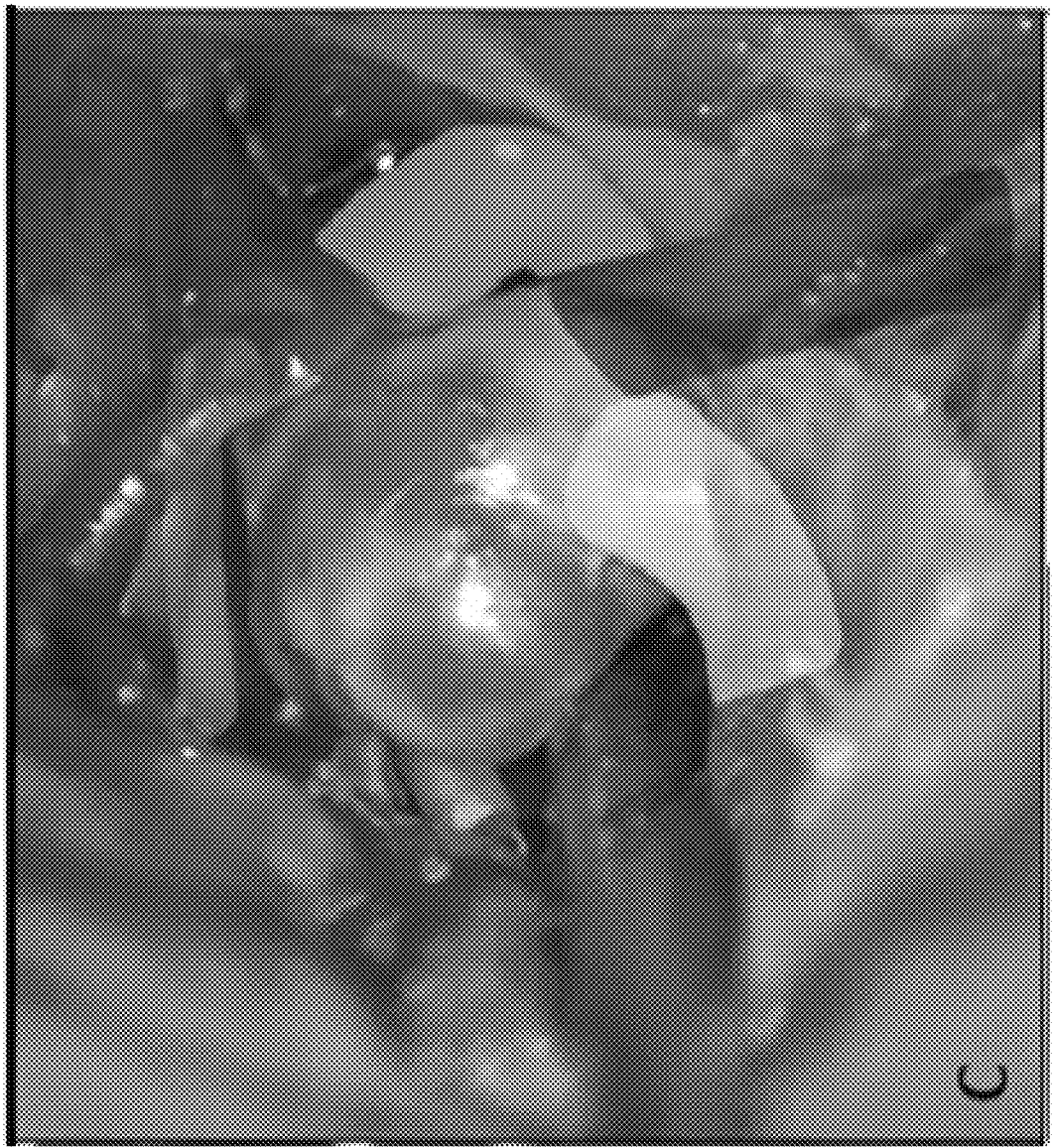

Patient 5: A 71-year-old man presented a wide-neck unruptured ACom aneurysm, with a maximum diameter of 6 mm and a neck of 6.5 mm. The ACom complex was mainly fed by a dominant right A1 and showed the origin of a supplementary third A2 branch, as shown in FIGS. 17A-17C. Because the dome projected into the interhemispheric fissure, the right gyrus rectus partially concealed the aneurysm. In this case, the identification and dissection of all three A2s branches are mandatory before the aneurysm is clipped in order to avoid ischemic complications. The possibility of a virtual 3D reconstruction of the anatomy and the possibility to rotate the model and fade some structures with the MR application helped to visualize in advance the origin of the three A2s and their relationship with the aneurysm neck, thus facilitating optimization of the surgical plan. The aneurysm was successfully excluded through a right LSO approach.

FIG. 14A illustrates a preoperative CTA in sagittal, coronal, and axial view showing an ACom aneurysm in patient 1. FIG. 14B illustrates a screenshot from the application, showing the aneurysm with a tilted and twisted ACom complex. In FIG. 14B, the vessels of interest are colored red, the optic apparatus is colored yellow, and the bones (in white) have been faded. FIG. 14C illustrates an intraoperative picture with the aneurysm exposed (right A1 in blue, right A2 in yellow, and left A2 in green).

FIG. 15A illustrates a preoperative CTA in sagittal, coronal, and axial views showing a left MCA aneurysm in patient 4. FIG. 15B illustrates a screenshot from the application. In FIG. 14B, the skull bones (in white) and the left temporal and frontal lobes (in brown) have been faded to visualize the aneurysm. FIG. 15C illustrates an intraoperative view, showing the proximal MCA (in yellow), the aneurysm, and the distal MCA branches (in blue and green).

FIG. 16A illustrates a preoperative CTA in sagittal, coronal, and axial views showing a left carotido-ophthalmic aneurysm in patient 4. FIG. 16B illustrates a screenshot from the application. In FIG. 16B, the skull bones (in white) have been faded, The left optic nerve (a part of the optic apparatus, in yellow) covers the neck and part of the dome of the aneurysm, which project medially (upper inlet). When the optic apparatus (lower inlet) is faded, it is possible to visualize the neck of the aneurysm and the origin of the ophthalmic artery. FIG. 16C illustrates an intraoperative picture, showing the left optic nerve (in yellow) mobilizing medially such that the aneurysm and the origin of the ophthalmic artery (in green) can be visualized.

FIG. 17A illustrates a preoperative CTA with sagittal, coronal, and axial views of an ACom aneurysm in patient 5. FIG. 17B illustrates a screenshot from the application where the skull bones, other cerebral lobes, and the optic apparatus has been hidden. In FIG. 17B, the right frontal lobe (in brown) covers the aneurysm. When the lobe is faded, the aneurysm and the surrounding vessels are properly visualized and the right A1 appears dominant. FIG. 17C illustrates an intraoperative view showing, after partial removal of the right gyrus rectus and the mobilization of the right A2 (in yellow), the right A1 (in dark blue), the left A1 (in orange), the left A2 (in green) and the supplementary A2 (in light blue).

Discussion: Preoperative rehearsal is of paramount importance in neurosurgery. VR has been a useful new technology in recent years, above all for planning and educational purposes. Using occlusive devices, the user can visualize 3D models of neuroanatomic structures and freely interact with them, with a demonstrated utility for neurovascular surgical planning. The possibility to display a hologram superimposed onto the real world makes this tool potentially usable during both surgical planning and surgery itself. In fact, it has been already used to guide operations in several neurosurgical fields, from neurovascular, to oncologic and spine diseases. In neurovascular surgery, one use for XR has been the intraoperative injection of a holographic model in the microscope eyepiece to guide cerebrovascular surgeries. Such a setup was used during surgical treatment of cerebral aneurysms and artero-venous malformations (AVMs), and to perform extracranial to intracranial bypasses. The technology was generally found to be useful and reliable, with however a need for integration of hemodynamic information within the digital model. In various embodiments, XR may be used to visualize different vascular imaging datasets in a virtual model of cerebral aneurysms. In various embodiments, an MR system may be used for the surgical planning for uIAs clipping.

In the study, educational utility had the highest evaluation score. Neurovascular anatomy is characterized by high complexity and case-by-case variability and the MR application facilitated its comprehension in a very intuitive way. Such technology promotes a shift from the conception of the systematic anatomy, learned during academic education, to a 3D topographic visualization, which instead better reflects the real surgical experience. In the study, this enhanced visualization was found to be useful for residents and trainees. At the same time, it was also appreciated by the experienced neurosurgeons for facilitating a mental planning of the clipping technique. This was especially true in cases of aneurysms showing uncommon configurations, like in the case example with a carotid-ophthalmic aneurysm projecting medially or in the case with a supplementary A2 trunk.

In various embodiments, the MR application allows users to freely interact with the hologram enabled simulation of the surgical tilt and rotation of the patient's head, thus maximizing the retraction effect of gravity and minimizing the need for brain retraction. In various embodiments, the MR application allows users to mentally simulate the extent of the craniotomy in advance by changing the opacity of the skull bone windows and of the cerebral lobes through the 'fading structures' tool, thus allowing visualization of the deep-seated structures of interest. Moreover, the MR application may provide insight to surgeons when choosing surgical options, such as the side of the craniotomy and the angle to approach the aneurysms, which take into account hemispheric dominance, hemodynamic characteristics, orientation of the aneurysm, twisting of the ACom complex, and length of M1 and supraclinoid carotid segments. These characteristics appeared easily perceptible through the enhanced visualization given by the MR system.

In the survey, the tool allowing the visualization of the source imaging (CTA) overlaid onto the holographic model received highly positive feedback, especially from the residents. The mental reconstruction of the 3D anatomy starting from the traditional 2D imaging is a difficult task, especially for trainees. In various embodiments, tridimensional rendering may improve this step. In various embodiments, the MR application provides an immersive visualization making the interpretation of standard neuroimaging easier. In various embodiments, the MR application allows the user to visualize further important information about the brain vessels that may influence the surgical strategy, such as the presence of calcifications.

In various embodiments, with the possibility to view (e.g., scroll) the source images co-registered onto the model, reliability of the model may be determined. In various embodiments, original images (e.g., MRI images) used in the generation of the visualization may be overlaid with the visualization, allowing a user to visually confirm the presence or absence of features determined during 3D model generation. For example, a user may visually confirm tumor boundaries where a tumor was segmented prior to model generation.

Participants also appreciated the rendering quality of the holograms. All the 3D models imported in the MR environment were appositely checked to find the optimal trade-off between the graphical resolution and its size, to achieve the best hologram stability. Depth perception, which is made possible by the presence of two distinct screens onto which slightly different images are projected and visualized, was deemed satisfactory compared with 2D-screens.

In various embodiments, segmentation may be performed on one or more medical images during (or prior to) generating the holographic model. To make the MR usable during the routine surgical practice, this process should be fast and reliable. In this context, the quality of the source imaging has an important role. In various embodiments, high-quality exams may result in easier and faster segmentation, both with automated and manual modalities, thus influencing the final quality of the hologram. For example, rendering of a MCA aneurysm may fail because of poor quality of the CTA. In another example, rendering of some critical structures, such as perforating arteries, which are of critical concern during aneurysm surgical treatment may not be possible due to source imaging device limitations (e.g., low resolution).

Conclusions: The increased development and the availability of MR systems may have an important clinical and educational impact in neurosurgery. The survey of a preliminary experience in neurovascular surgery in a hospital system demonstrated the usefulness of MR in surgical planning for uIAs clipping due to the reliability of the holographic models as well as their ease of use.

In various embodiments, anatomical neuroimaging with functional data and/or hemodynamic parameters may be integrated into the MR system.

Figure 11:
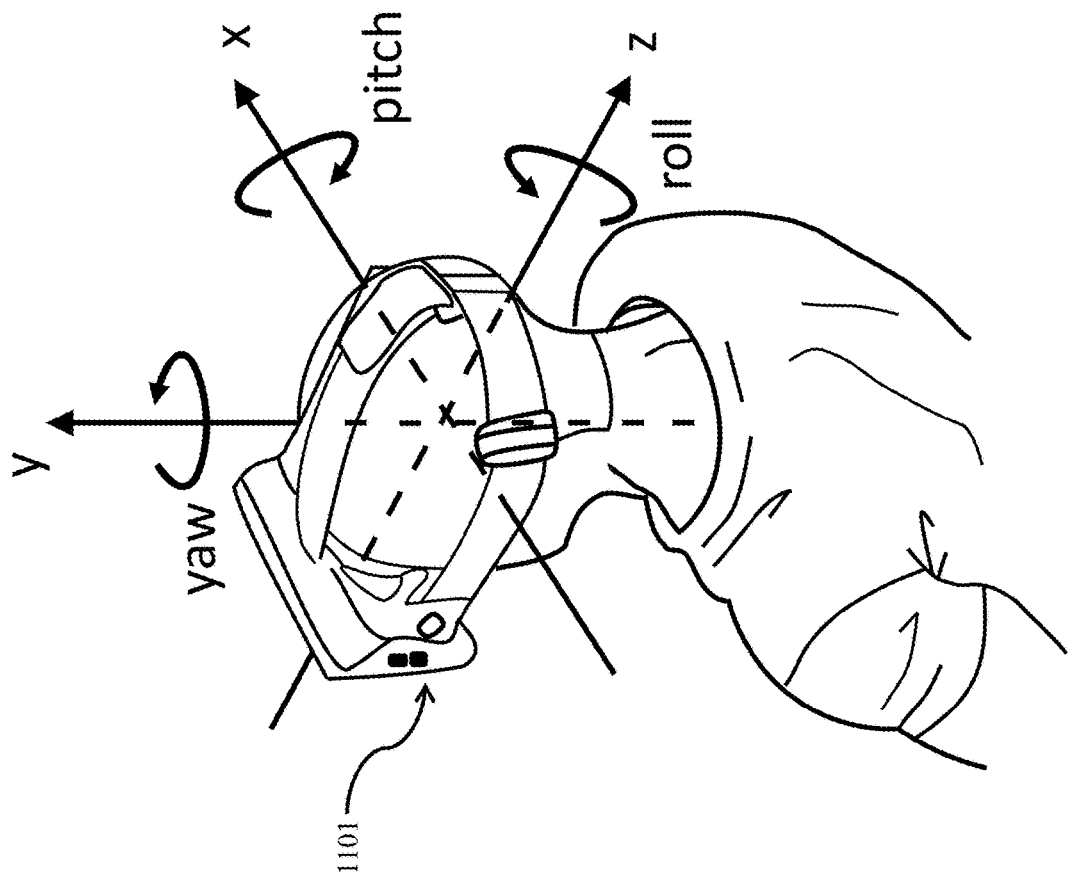
FIG. 11 illustrates an exemplary virtual reality headset according to embodiments of the present disclosure.

With reference now to FIG. 11, an exemplary virtual reality headset is illustrated according to embodiments of the present disclosure. In various embodiments, system 1100 is used to collected data from motion sensors including hand sensors (not pictured), sensors included in headset 1101, and additional sensors such as sensors placed on the body (e.g., torso, limbs, etc.) or a stereo camera. In some embodiments, data from these sensors is collected at a rate of up to about 150 Hz. As illustrated, data may be collected in six degrees of freedom: X—left/right; Y—up/down/height; Z—foreword/backward; P—pitch; R—roll; Y—yaw. As set out herein, this data may be used to track a user's overall motion to facilitate interaction with a virtual environment and to evaluate their performance. Pitch/Roll/Yaw may be calculated in Euler angles.

A Picture Archiving and Communication System (PACS) is a medical imaging system that provides storage and access to images from multiple modalities. In many healthcare environments, electronic images and reports are transmitted digitally via PACS, thus eliminating the need to manually file, retrieve, or transport film jackets. A standard format for PACS image storage and transfer is DICOM (Digital Imaging and Communications in Medicine). Non-image data, such as scanned documents, may be incorporated using various standard formats such as PDF (Portable Document Format) encapsulated in DICOM.

An electronic health record (EHR), or electronic medical record (EMR), may refer to the systematized collection of patient and population electronically-stored health information in a digital format. These records can be shared across different health care settings. Records may be shared through network-connected, enterprise-wide information systems or other information networks and exchanges. EHRs may include a range of data, including demographics, medical history, medication and allergies, immunization status, laboratory test results, radiology images, vital signs, personal statistics like age and weight, and billing information.

EHR systems may be designed to store data and capture the state of a patient across time. In this way, the need to track down a patient's previous paper medical records is eliminated. In addition, an EHR system may assist in ensuring that data is accurate and legible. It may reduce risk of data replication as the data is centralized. Due to the digital information being searchable, EMRs may be more effective when extracting medical data for the examination of possible trends and long term changes in a patient. Population-based studies of medical records may also be facilitated by the widespread adoption of EHRs and EMRs.

Health Level-7 or HL7 refers to a set of international standards for transfer of clinical and administrative data between software applications used by various healthcare providers. These standards focus on the application layer, which is layer 7 in the OSI model. Hospitals and other healthcare provider organizations may have many different computer systems used for everything from billing records to patient tracking. Ideally, all of these systems may communicate with each other when they receive new information or when they wish to retrieve information, but adoption of such approaches is not widespread. These data standards are meant to allow healthcare organizations to easily share clinical information. This ability to exchange information may help to minimize variability in medical care and the tendency for medical care to be geographically isolated.

In various systems, connections between a Picture Archiving and Communication System (PACS), Electronic Medical Record (EMR), Hospital Information System (HIS), Radiology Information System (RIS), or report repository are provided. In this way, records and reports form the EMR may be ingested for analysis. For example, in addition to ingesting and storing HL7 orders and results messages, ADT messages may be used, or an EMR, RIS, or report repository may be queried directly via product specific mechanisms. Such mechanisms include Fast Health Interoperability Resources (FHIR) for relevant clinical information. Clinical data may also be obtained via receipt of various HL7 CDA documents such as a Continuity of Care Document (CCD). Various additional proprietary or site-customized query methods may also be employed in addition to the standard methods.

Figure 12:
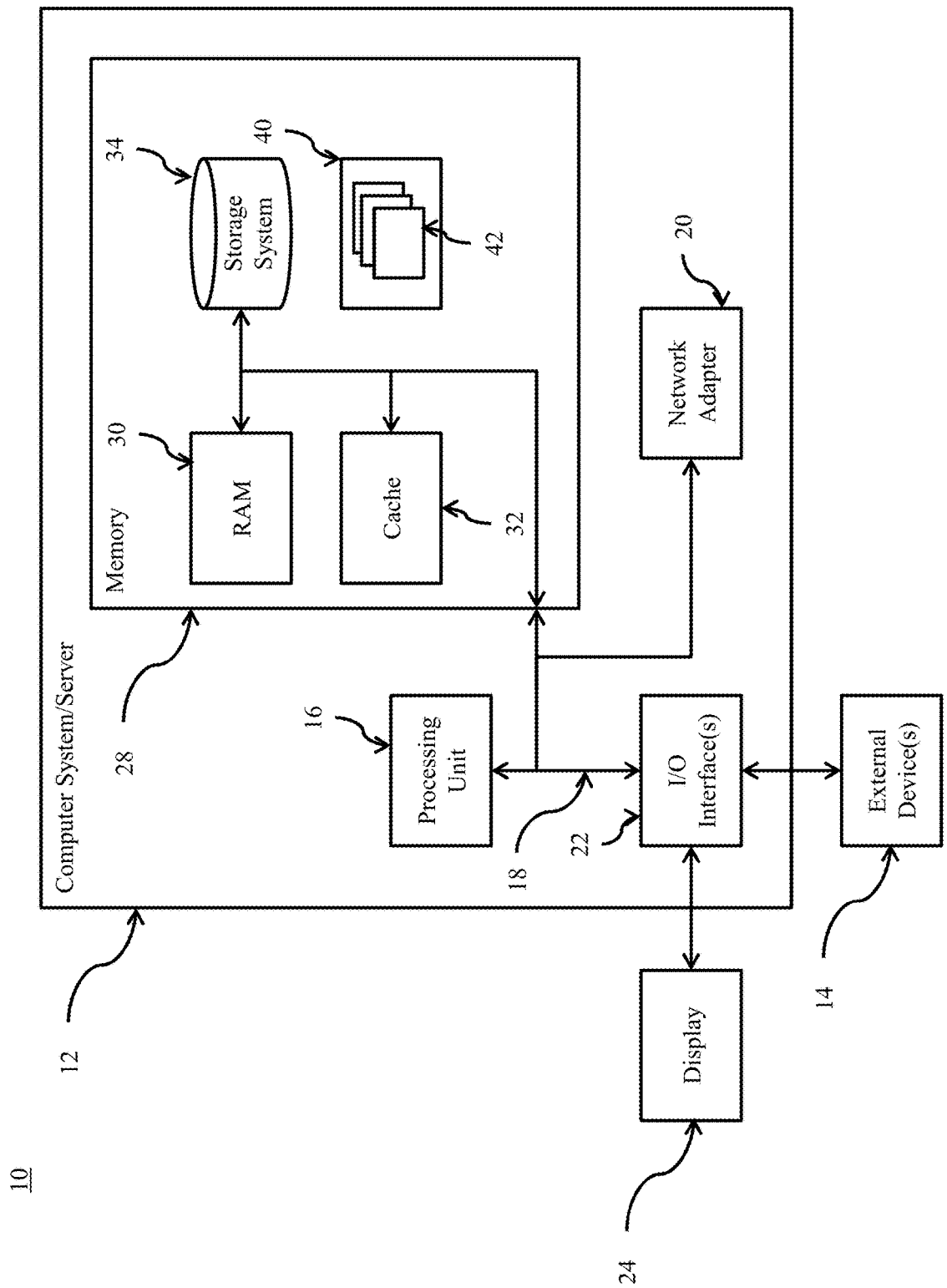
FIG. 12 depicts a computing node according to an embodiment of the present invention.

Referring now to FIG. 12, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for rendering a three-dimensional anatomical model, the method comprising:

reading, at a remote server, a three-dimensional imaging study from a data store, the three-dimensional imaging study comprising a plurality of two-dimensional slices of at least one anatomical structure;

performing segmentation, at the remote server, on each of the plurality of two-dimensional slices based on a treatment or surgical plan;

generating, at the remote server, a volumetric model of the at least one anatomical structure based on the plurality of two-dimensional slices, wherein the volumetric model comprises a plurality of segments based on the segmentation, each segment of the plurality of segments having a first resolution;

selecting at least one target segment of the plurality of segments, the at least one target segment corresponding to a target region of the at least one anatomical structure, the target region being along a treatment or surgical path;

scaling, at the remote server, the at least one target segment according to one or more display parameters of a virtual or augmented reality device, the scaling generating at least one scaled target segment at a second resolution, the scaling generating the at least one scaled target segment by resampling at the second resolution, the second resolution higher than the first resolution;

updating the volumetric model with the at least one scaled target segment;

receiving, at the virtual or augmented reality device, the updated volumetric model; and rendering, at the virtual or augmented reality device, the updated volumetric model.

2. The method of claim 1, wherein the three-dimensional imaging study comprises magnetic resonance imaging (MRI).

3. The method of claim 1, wherein the three-dimensional imaging study comprises computed tomography (CT).

4. The method of claim 1, wherein the three-dimensional imaging study comprises angiography.

5. The method of claim 1, wherein generating the volumetric model comprises performing interpolation between adjacent slices in the plurality of two-dimensional slices.

6. The method of claim 1, wherein generating the volumetric model comprises selecting a subset of the plurality of two dimensional slices.

7. The method of claim 1, further comprising receiving the treatment or surgical plan from a medical server.

8. The method of claim 7, wherein the medical server comprises an electronic health record.

9. The method of claim 1, further comprising determining one or more organs-at-risk based on the received treatment or surgical plan.

10. The method of claim 1, further comprising providing, in the virtual or augmented reality system, an indication of the one or more organs-at-risk.

11. The method of claim 10, wherein providing the indication comprises highlighting the one or more organs-at-risk.

12. The method of claim 10, wherein providing the indication comprises rendering a volumetric model of the one or more organs-at-risk.

13. The method of claim 9, further comprising increasing a resolution of the one or more organs-at-risk in the scaled volumetric model relative to a surrounding resolution.

14. The method of claim 7, wherein generating the volumetric model comprises determining, at the remote server, one or more relevant anatomical structures from the treatment or surgical plan.

15. The method of claim 1, wherein the one or more display parameters comprises a target resolution.

16. The method of claim 14, wherein rendering the scaled volumetric model comprises rendering only the one or more relevant anatomical structures from the treatment or surgical plan.

17. The method of claim 7, further comprising receiving, from a user, an adjustment to the treatment or surgical plan.

18. The method of claim 17, further comprising determining, at the remote server, an updated treatment or surgical plan based on the adjustment.

19. The method of claim 18, further comprising determining updated one or more organs-at-risk based on the updated treatment or surgical plan.

20. The method of claim 1, further comprising:
determining one or more missing anatomical structures in the volumetric model; and
accessing an anatomical atlas to retrieve the one or more missing anatomical structures for inclusion in the volumetric model.

21. The method of claim 1, further comprising:
rendering, at the virtual or augmented reality device, a user interface selected according to the treatment or surgical plan.

22. The method of claim 21, wherein the user interface comprises:
a control for showing or hiding anatomical structures;
a control for displaying one or more treatment plan outlines and contours;
a control for selection of one or more planes of the three-dimensional imaging study;
a control for fading the anatomical structures; and/or
a control for setting a clipping plane.

23. The method of claim 1, further comprising:
rendering, at the virtual or augmented reality device, one or more of the plurality of two-dimensional slices.

24. The method of claim 7, wherein the treatment or surgical plan comprises stereotactic radiosurgery.

25. The method of claim 7, wherein the treatment or surgical plan comprises vascular neurosurgery.

26. A system for rendering a three-dimensional anatomical model, the system comprising:
a remote server comprising a first computing node comprising a computer readable storage medium having program instructions embodied therewith, the program instructions executable by a processor of the first computing node to cause the processor to perform a method comprising:
reading a three-dimensional imaging study from a data store, the three-dimensional imaging study comprising a plurality of two-dimensional slices of at least one anatomical structure;
performing segmentation, at the remote server, on each of the plurality of two-dimensional slices based on a treatment or surgical plan;
generating, at the remote server, a volumetric model of the at least one anatomical structure based on the plurality of two-dimensional slices, wherein the volumetric model comprises a plurality of segments based on the segmentation, each segment of the plurality of segments having a first resolution;
selecting at least one target segment of the plurality of segments, the at least one target segment corresponding to a target region of the at least one anatomical structure, the target region being along a treatment or surgical path;
scaling, at the remote server, the at least one target segment according to one or more display parameters of a virtual or augmented reality device, the scaling generating the at least one scaled target segment by resampling at the second resolution, the scaling generating the at least one scaled target segment by resampling at the second resolution, the second resolution higher than the first resolution;
updating, at the remote server, the volumetric model with the at least one scaled target segment;
a virtual or augmented reality system comprising a virtual or augmented reality display and a second computing node comprising a computer readable storage medium having program instructions embodied therewith, the program instructions executable by a processor of the second computing node to cause the processor to perform a method comprising:
receiving the updated volumetric model; and
rendering, in the display, the updated volumetric model.

27. A computer program product for rendering a three-dimensional anatomical model, the computer program product comprising a computer readable storage medium having program instructions embodied therewith, the program instructions executable by a processor to cause the processor to perform a method comprising:
reading, at a remote server, a three-dimensional imaging study from a data store, the three-dimensional imaging study comprising a plurality of two-dimensional slices of at least one anatomical structure;

performing segmentation, at the remote server, on each of the plurality of two-dimensional slices based on a treatment or surgical plan;

generating, at the remote server, a volumetric model of the at least one anatomical structure based on the plurality of two-dimensional slices, wherein the volumetric model comprises a plurality of segments based on the segmentation, each segment of the plurality of segments having a first resolution;

selecting at least one target segment of the plurality of segments, the at least one target segment corresponding to a target region of the at least one anatomical structure, the target region being along a treatment or surgical path;

scaling, at the remote server, the at least one target segment according to one or more display parameters of a virtual or augmented reality device, the scaling generating at least one scaled target segment at a second resolution, the scaling generating the at least one scaled target segment by resampling at the second resolution, the second resolution higher than the first resolution;

updating, at the remote server, the volumetric model with the at least one scaled target segment;

receiving, at the virtual or augmented reality device, the updated volumetric model; and rendering, at the virtual or augmented reality device, the updated volumetric model.

* * * * *